United States Patent [19]

Imai et al.

[11] Patent Number: 5,080,219
[45] Date of Patent: Jan. 14, 1992

[54] DRIVER SYSTEM ROLLER APPARATUS

[75] Inventors: Masao Imai, Inuyama; Gokichi Hatouchi; Yoshihiko Fujio, both of Komaki, all of Japan

[73] Assignee: Daifuku Co., Ltd., Japan

[21] Appl. No.: 668,276

[22] Filed: Mar. 11, 1991

[30] Foreign Application Priority Data

| Mar. 13, 1990 | [JP] | Japan | 2-61500 |
| Mar. 13, 1990 | [JP] | Japan | 2-61501 |
| Apr. 20, 1990 | [JP] | Japan | 2-105989 |
| Apr. 20, 1990 | [JP] | Japan | 2-105990 |
| Jun. 4, 1990 | [JP] | Japan | 2-145894 |
| Jun. 12, 1990 | [JP] | Japan | 2-153243 |
| Oct. 2, 1990 | [JP] | Japan | 2-264747 |
| Oct. 15, 1990 | [JP] | Japan | 2-277212 |
| Oct. 15, 1990 | [JP] | Japan | 2-277213 |

[51] Int. Cl.⁵ .................................. B65G 13/06
[52] U.S. Cl. ................................ 198/781; 198/789
[58] Field of Search ............. 198/781, 788, 789, 780

[56] References Cited

U.S. PATENT DOCUMENTS

| 1,733,379 | 10/1929 | Löwy | 198/788 |
| 4,314,629 | 2/1982 | Shilander et al. | 198/781 X |
| 4,325,474 | 4/1982 | Rae | 198/781 |
| 4,366,899 | 1/1983 | Doro | 198/781 |
| 4,401,208 | 8/1983 | Allmacher, Jr. | 198/781 |

FOREIGN PATENT DOCUMENTS 0008111 1/1988 Japan ................................ 198/788

Primary Examiner—D. Glenn Dayoan
Attorney, Agent, or Firm—Barnes, Kisselle, Raisch, Choate, Whittemore & Hulbert

[57] ABSTRACT

A drive system roller apparatus used for a roller conveyor built in a shelf device or a roller conveyor installed on a floor, wherein at the outer periphery of a roller shaft supported at a frame is provided a roller body rotatable and supporting a load to be transported, between the roller body and the roller shaft is provided an annular flexible member which is capable of expanding and contracting so as to contact with and remove from the inner periphery of the roller body by the expansion and contraction, and the flexible member is rotatably driven, so that an operating fluid is supplied from the fluid route into the flexible member, and the flexible member in the contacting state is expanded to abut against the inner surface of the roller body, thereby the roller body rotates to transport a load.

11 Claims, 25 Drawing Sheets

DRIVER SYSTEM ROLLER APPARATUS

FIELD OF THE INVENTION

The present invention relates to a drive system roller apparatus used for, for example, a roller conveyor built in a shelf device or a roller conveyor installed on a floor.

THE PRIOR ART

A well-known roller conveyor using a drive system roller apparatus has been disclosed in, for example, the Japanese Patent Laid-Open Gazette No. Sho 57-160807. This well-known construction is that a number of rollers are supported freely rotatably only on a main frame composed of parallel rails so as to form a transportation route. A casing is mounted to the main frame by use of a support bracket or the like and a pin extending axially of the roller is provided at the casing. A wheel simultaneously contactable with the outer periphery of the lower portion of a pair of rollers adjacent to each other and a sprocket to be subjected to a driving force are integrally rotatably provided on the pin. A driving chain supported at the casing side and guided is engaged with the sprocket. Between the casing and the pin is provided a diaphragm system driving apparatus for moving the pin up and down.

In this well-known roller conveyor, the driving chain rotates the wheel through the sprocket, the rotation of wheel is transmitted to the pair of rollers abutting against the wheel, and a number of rollers rotate to transport along the transportation route an object to be transported. Supply and discharge of working fluid is controlled to move the pin up and down so as to switch the roller into the driving state where the wheel abuts against the roller and the not-driving state where the same leaves the roller, thereby supplying or cutting off a transporting force to or from each object to be transported. Therefore, the objects to be transported are controlled not to collide with each other.

However, since the wheel or the like is disposed below the roller, the roller conveyor has a defect of making it bulk as a whole and large-sized. Also, oil or dust at the transported object side is liable to enter between the roller and the wheel, thereby adversely affecting transmission of a torque utilizing the abutting.

SUMMARY OF THE INVENTION

An object of the invention is to provide a drive system roller apparatus which can be made compact and constructed not to allow unnecessaries, such as oil and dust, to enter into a torque transmitting part.

In order to attain the above object, the present invention has;

a frame disposed in the direction of transportation of the roller conveyor;

a roller shaft supported to the frame;

a roller body rotatably disposed at the outer periphery of the roller shaft and supportable of a load to be transported;

a ring-like flexible member rotatably disposed between the roller shaft and the roller body and expandable and contractible to be capable of abutting against and moving away from the inner surface of the roller body by means of expansion and contraction; fluid supply means which perforates the roller shaft, is open in the flexible member, and supplies working fluid therein, so that the flexible member in the drive system roller apparatus which can be made compact and constructed not to allow unnecessaries, such as oil and dust, to enter into a torque transmitting part.

In order to attain the above object, the present invention has; a rotatable driving means, so that the flexible member is expanded by the pressure of fluid and abuts against the inner surface of the roller body, thereby transmitting the torque to the roller body to transport the object to be transported. Also, when pressure in the flexible member is released through the fluid supply and discharge means, the flexible member contracts to leave the inner surface of the roller body to result in that the torque is not transmitted, thereby stopping the rotation of roller body.

Thus, the flexible member capable of transmitting and cutting off the torque is built in the roller body, whereby the entire apparatus is made not-bulky and compact. Moreover, the torque transmitting part can prevent a foreign object from entering therein.

The above and further objects and novel features of the invention will more fully appear from the following detailed description when the same is read in connection with the accompanying drawings.

DETAILED DESCRIPTION OF THE EMBODIMENT

Next, the first embodiment of the drive system roller apparatus of the invention will be described with reference to the drawings, which is exemplary of being applied to a shelf means.

Figure 4:
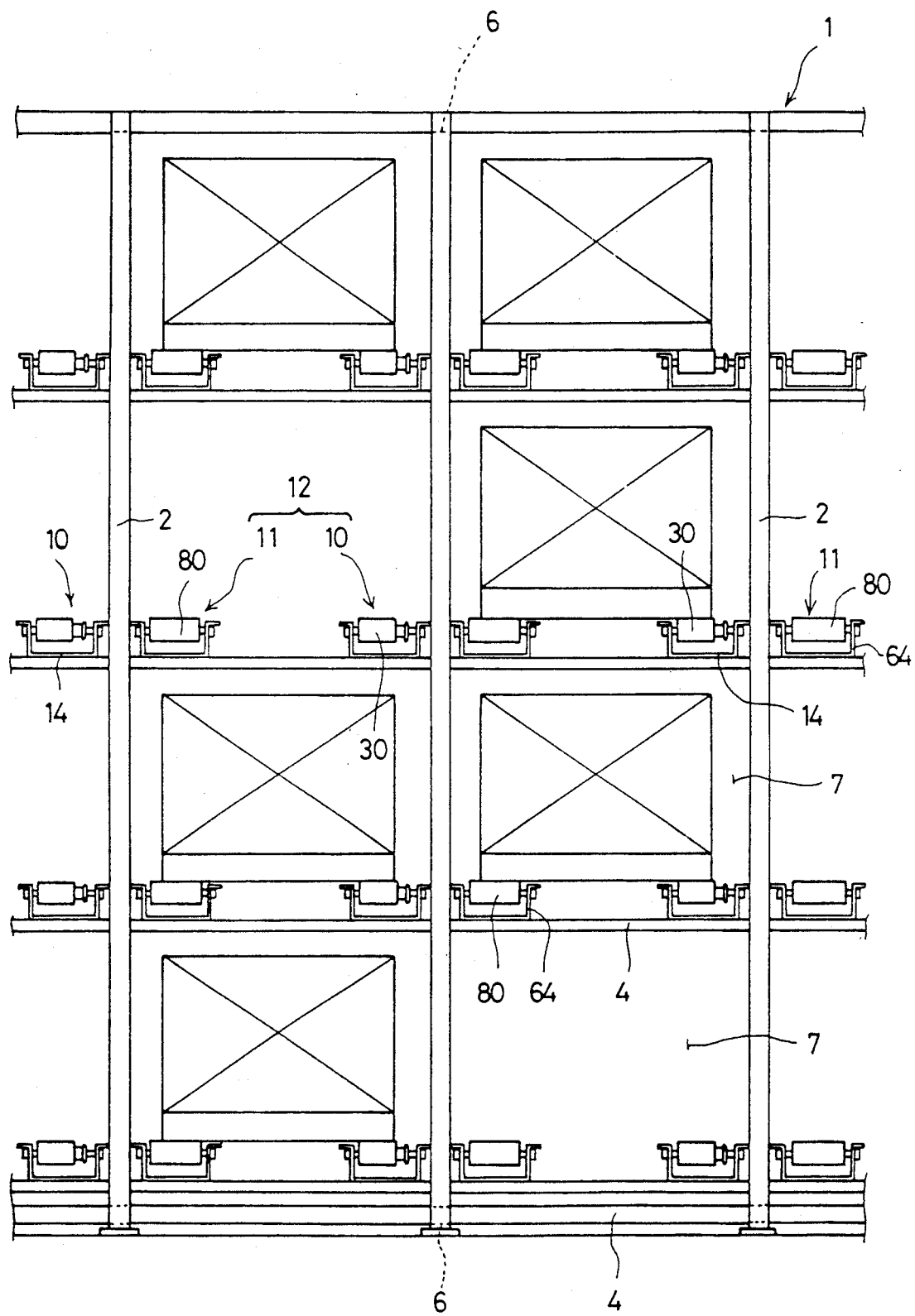
FIG. 4 is a front view of a shelf means using the drive system roller apparatus.
Figure 5:
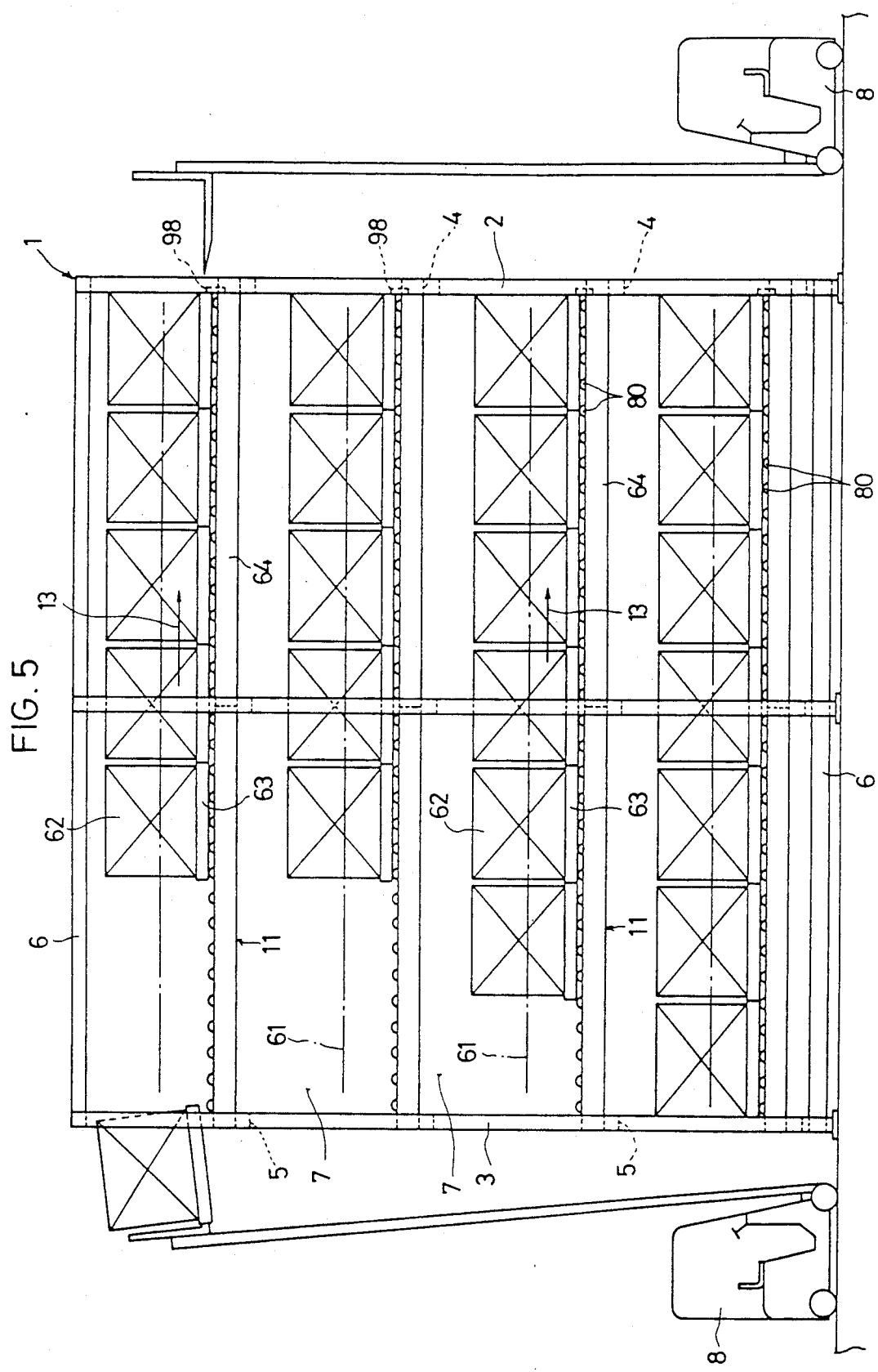
FIG. 5 is a side view of the shelf means.

In FIGS. 4 and 5, reference 1 designates a shelf frame, which has a plurality of front supports 2 and rear supports 3, front horizontal members 4 for connecting the front supports with each other, rear horizontal members 5 for connecting the rear supports 3 with each other, and connecting members 6 for connecting the front supports 2 and rear support 3 with each other. The supports 2 and 3, horizontal members 4 and 5, and connecting members 6, form a plurality of horizontal and vertical partition housing spaces 7.

In the partition housing spaces 7 are horizontally disposed transort devices 12 comprising a pair of roller conveyors 10 and 11 in relation of being transported in the transporting direction 13 depth-wise of the shelf frame 1. As shown in FIGS. 1 through 4, one roller conveyor 10 has a conveyor frame 14 extending lengthwise of the conveyor 10. The conveyor frame 14 comprises a pair of side plates 15 and 16, upper plates 17 and 18 bending upwardly from the upper end of both the side plates 15 and 16, and a base plate 19 for connecting the lower ends of both the side plates 15 and 16 and is U-like-shaped in section. Across the side plates 15 and 16 and upper plates 17 and 18, a plurality of cutouts 20 and 21 for mounting a drive system roller apparatus (to be hereinafter discussed) are formed and spaced at predetermined pitches lengthwise of the conveyor frame 14. On the inner surface of the lower portion of one side plate 16 is formed a bolt bore 22 for inserting therethrough and fixing guide rails thereto.

The conveyor frame 14 is removably fixed to the shelf frame 1. Therefore, bolt bores 23 are formed at the base plate 19, nuts 24 fitted thereto are fixed on the base plate 19 in the conveyor frame 14, and bolts 26 are inserted from below into through bores 25 formed at the horizontal members 4 and 5 and then screwablably engages with the nuts 24 respectively.

A drive system roller apparatus 30 provided at the conveyor frame 14 has caps 32 and 33 of hard rubber fitted on a roller shaft 31 at the apparatus 30. The caps 32 and 33 are dropped from above into cutouts 20 and 21, thereby supporting the roller shaft 31 to the conveyor frame 14. On one half of roller shaft 31 is rotatably fitted a tubular member 35 through a bush 34 and at one end of the tubular member 35 is integrally provided a sprocket 36. A tubular roller body 37 is fitted on across the tubular member 35 and the other half of the roller shaft 31, and rotatably supported with respect to the roller shaft 31 through bearings 38 and 39 provided between the roller body 37 and the tubular member 35 and between the roller body 37 and the roller shaft 31.

On the outer periphery of the tubular member 35 and between both the bearings 38 and 39 is fitted a rubber tire 40 expanding or contracting to be contactable with or removable from the inner surface 37a of the roller body 37, the rubber tire 40 being fixed at both ends thereof by a pair of bands 41 and 42, and has a pair of tubular portions 40a at both ends 40a subjected to function of the bands 41 and 42, flanges 40b extending radially outwardly from the inner ends of tubular members 40a respectively, and abutting portions 40d disposed between the outer peripheral ends of the flanges 40b through elastic portions 40c. The elastic portions 40c elastically bias the abutting portions 40d to remove from the inner surface 37a, the rubber tire 40 being formed of material larger in a frictional force at the abutting portions.

A fluid supply and discharge conduit 43 perforating through the roller shaft 31 and tubular member 31 and being open in the rubber tire 40 is formed at the axis of the roller shaft 31 and between the one end and an intermediate portion thereof and comprises an axis passage 43a open radially of the roller shaft 31, an annular passage 43b recessed on the inner periphery of the tubular member 35 so as to always communicating with the axis passage 43b, a tubular portion passage 43 formed at the tubular portion 35 so as to communicate the annular passage 43b with the interior of the rubber tire 40, and a pipeline passage 43d formed at one cap 32 so as to communicate with the outer end of axis passage 43a, in addition, reference numerals 44, 45 and 46 designate sealing members and 47 designates a collar.

At one corner of the bottom of conveyor frame 14 is provided a guide rail 50 extending over the entire length of the conveyor frame 14. The guide rail 50 has a dovetail groove facing the side plate 15 and a pair of upper and lower guides 52 and 53. In the dovetail groove 51 is slidably fitted a plate-like nut 54. A bolt 55 inserted from the outside into a bolt bore 22 is screwably tightened to the nut 54, thereby fixing the guide rail 50 to the conveyor frame 14.

The upper and lower guides 52 and 53 support and guide an endless chain 56 at one and other portions thereof. A portion of chain 56 supported by the upper guide 52 always engages with the support 36 from below. As shown in FIG. 5, the chain 56 is stretched across a driving sprocket 57 and a driven sprocket 58 through a guide sprocket 59, the driving sprocket 57 being connected in association with a motor 60. Reference numeral 61 designates a transport route and 62 designates a load which is transported on a pallet 63.

Figure 1:
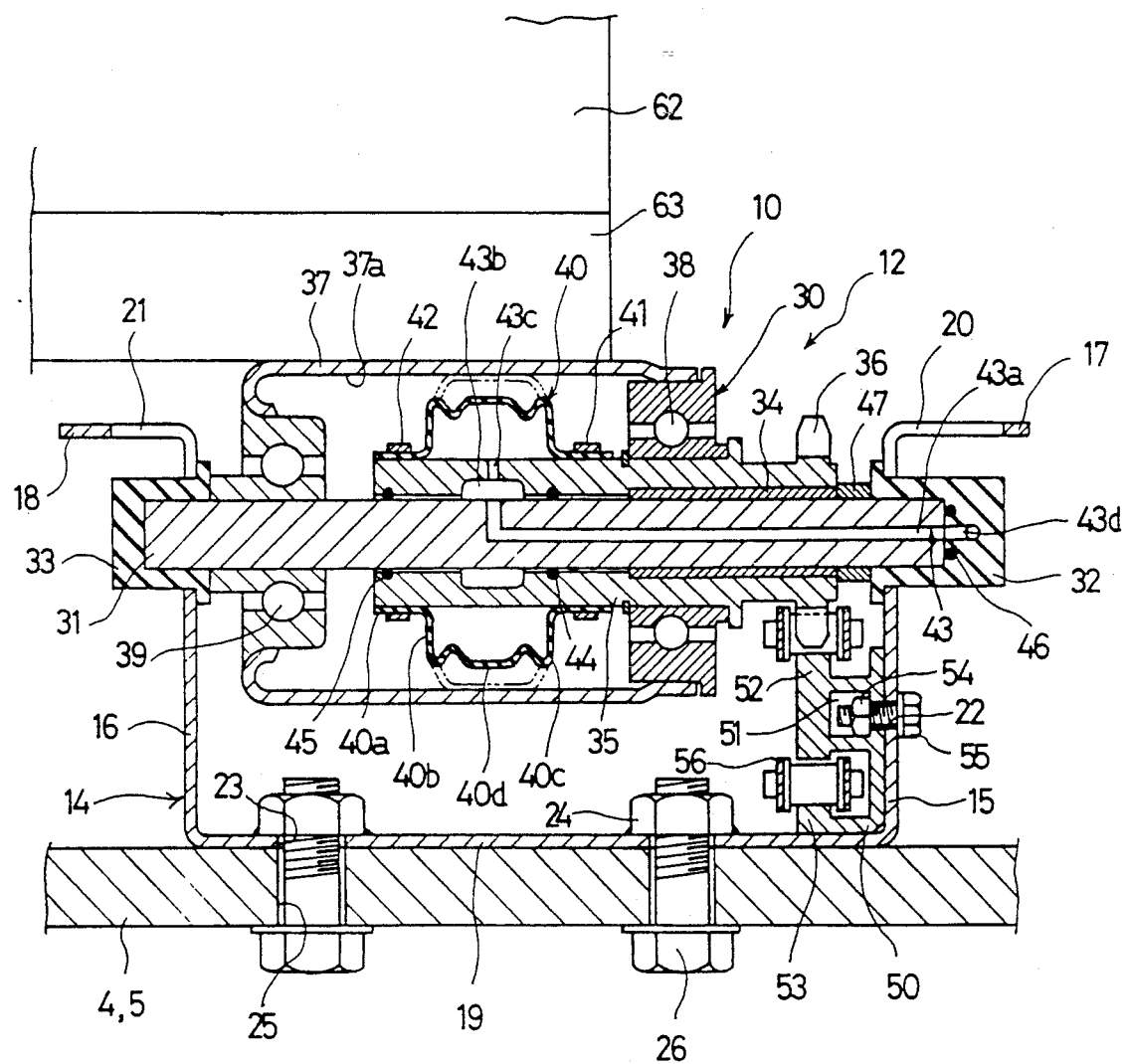
FIG. 1 is a sectional view of a first embodiment of a drive system roller apparatus of the invention, when viewed from the front, FIG. 2 a partially cutaway side view thereof.
Figure 3:
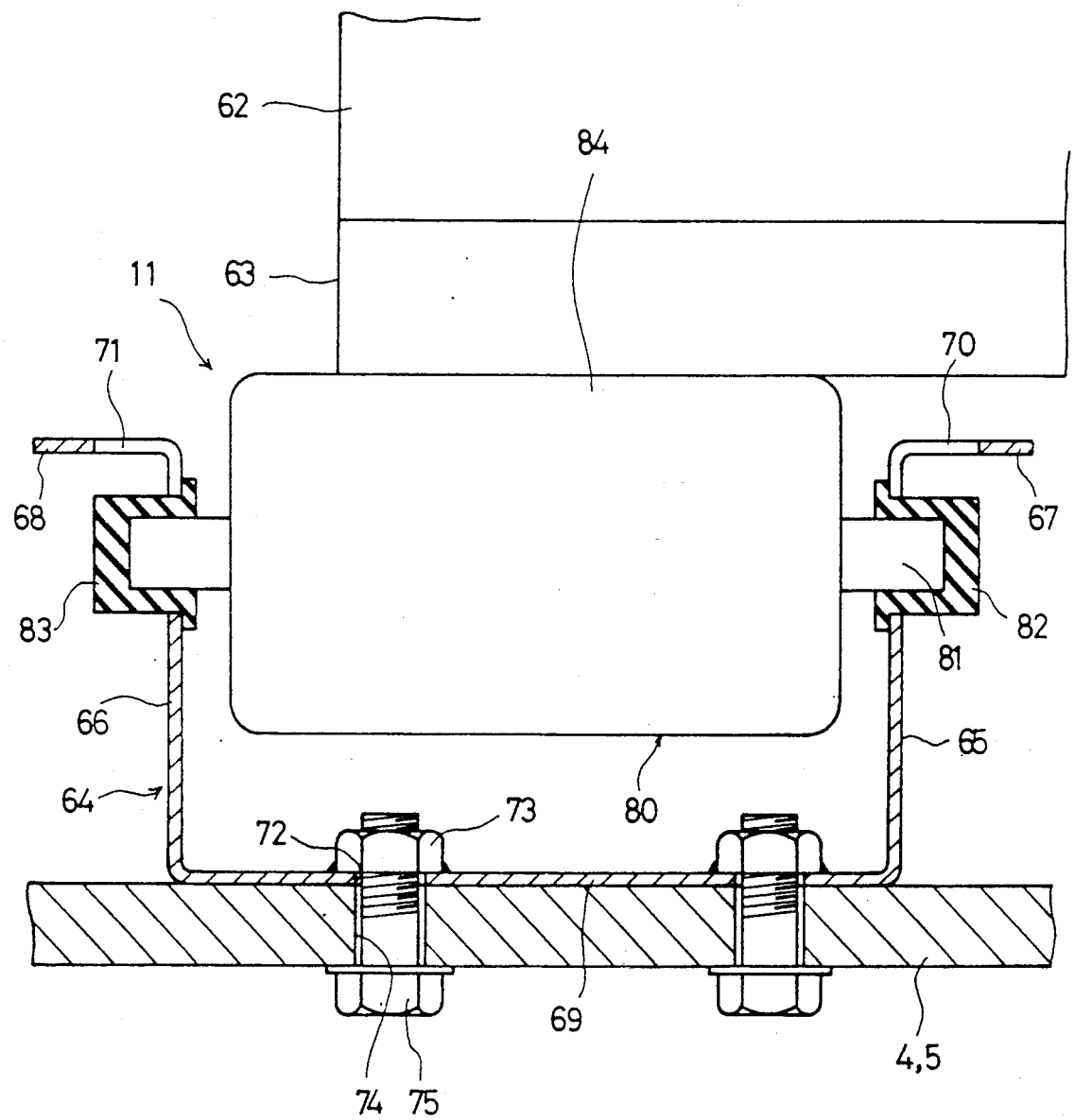
FIG. 3 is a front view of a free-rotatable roller in a pair with the drive system roller apparatus in FIG. 1.

As shown in FIGS. 1 and 3, a conveyor frame 64 at another roller 11 comprises a pair of side plates 65 and 66, upper plates 67 and 68 bending outwardly from the upper edges of both the side plates 65 and 66, and a base plate 69 for connecting between the lower ends of side plates 65 and 66 and is U-shaped in section. At portions across the upper portions of side plates 65 and 66 and the upper plates 67 and 68, a plurality of cutouts 70 and 71 for mounting rotatable rollers (to be hereinafter detailed) are formed lengthwise of the conveyor frame 64 and spaced at predetermined pitches.

Bolt bores 72 are formed at a base plate 69 and nuts 73 fitted to the bolt bores 72 are fitted onto the base plate 69. Bolts 75 inserted from below into through-bores 74 formed at the horizontal members 4 and 5 are screwed with nuts 73 through the bolt bores 72, thereby detachably fixing the conveyor frame 64 to the shelf frame 1.

Caps 82 and 83 of hard rubber are fitted onto both axial ends of a roller shaft 81 for a rotatable roller 80 so as to be dropped from above into the cutouts 70 and 71, thereby supporting the roller shaft 81 to the conveyor frame 64, a roller body 84 being rotatably fitted onto the roller shaft 81 through bearings or the like.

Figure 6:
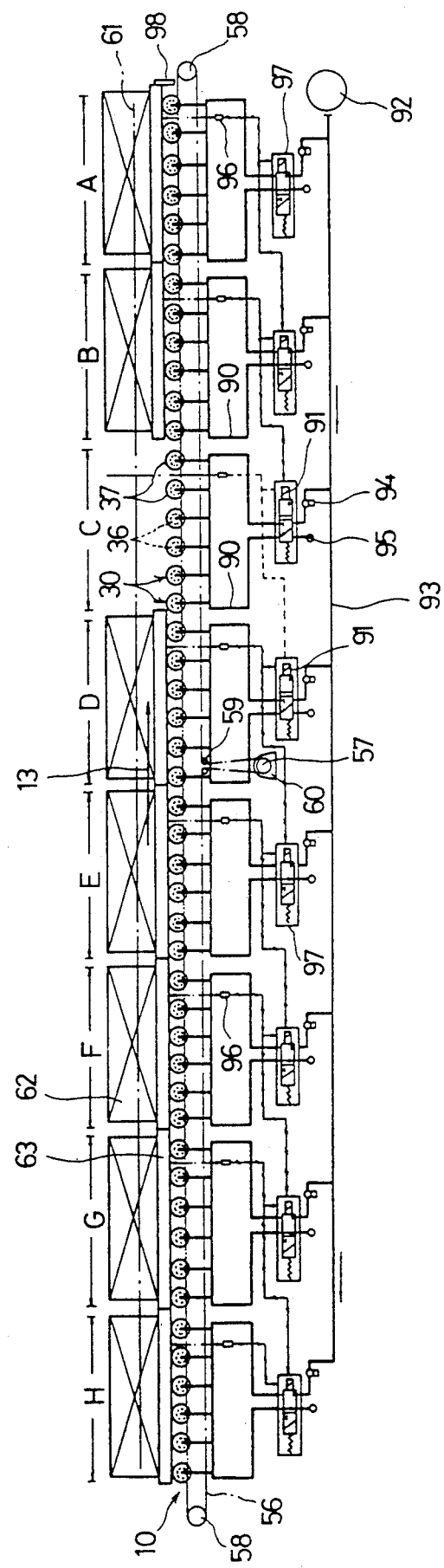
FIG. 6 is a schematic side view explanatory of operation of the shelf means.

The transport device 12 comprising a pair of roller conveyors 10 and 11, as shown in, for example, FIG. 6, a plurality, for example 6, of rollers disposed as the predetermined are formed in one group and a plurality of groups, for example, of 8 groups: A, B, C, D, E, F, G and H, are disposed in the transporting direction of the arrow 13. At respective groups A through H, the rubber tire 40 of roller conveyor 10 is made contactable or removable with or from the inner surface 37a of roller body 37.

In detail, at a unit of respective groups A through H, each pipeline passage 43d is connected in series to form a supply and discharge hose 90. The supply and discharge hose 90 can freely communicate or be cut off through a solenoid valve 91 with or from a common supply hose 93 extending from a fluid supply source 92 capable of supplying air or the like. Reference numeral 94 designates a regulator and 95 designates a silencer. At the downstream side of the respective groups A through H is provided a photoelectronic switch 96 exemplary of a load detector.

Two groups adjacent to each other in the transporting direction are so construction that, when the photoelectronic switch 96 at the upstream side group is in condition of detection and that 96 at the downstream side group is in condition of non-detection, the supply hose 93 communicates with the supply and discharge hose 90 so as to allow the rubber tire at both the groups to simultaneously abut against the roller body 37. Also, when the photoelectronic switches 96 at both the groups are simultaneously in condition of non-detection, the supply and discharge hose 90 is cut off from the supply hose 93 so that rubber tires 40 at both the groups simultaneously move away from the roller body 37. Therefore, each solenoid valve 91 is built in each control unit 97. Also, only the group A at the most downstream side is so constructed that when the photoelectronic switch detects a load, the rubber tire 40 leaves the roller body 37.

Next, explanation will be given on storage and transportation of a load 62.

Figure 2:
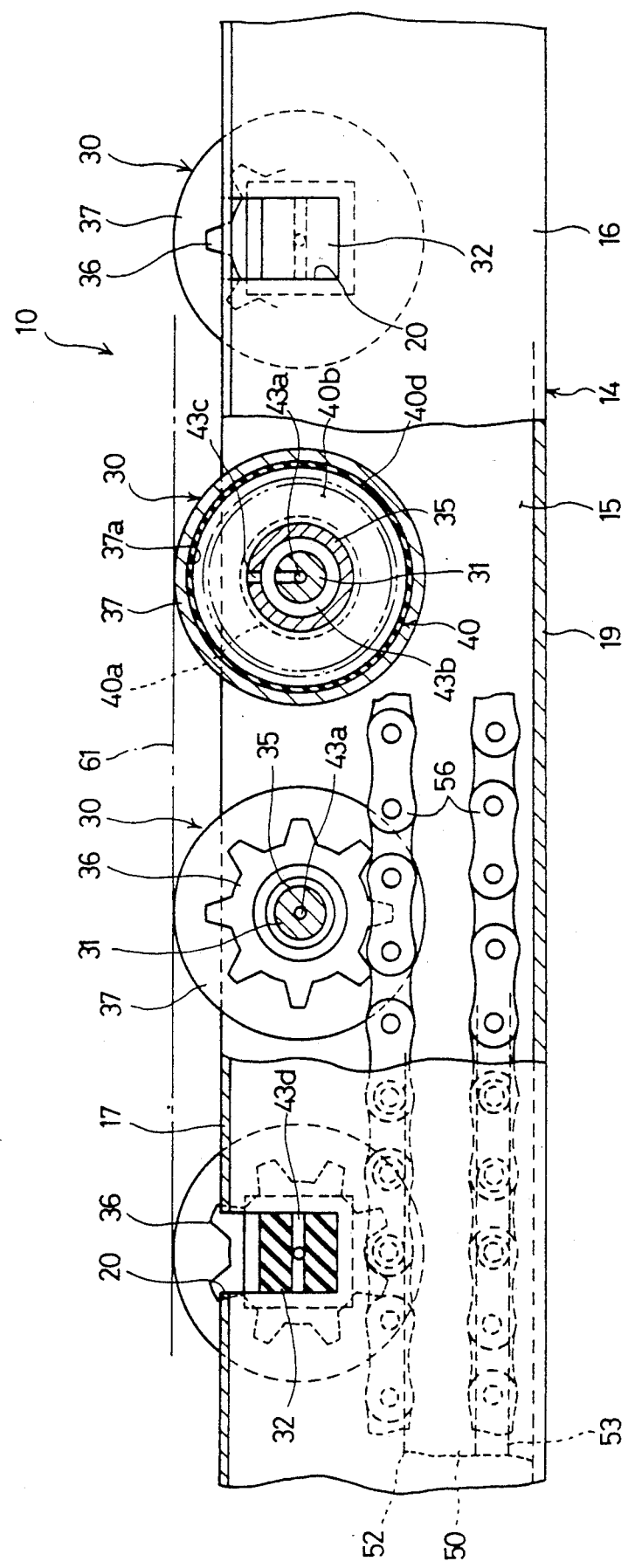

When the solenoid valve 91 is switched to connect the supply hose 93 to the supply and discharge hose 90 so that the rubber tire 40 is expanded by air pressure supplied through the fluid supply and discharge conduit 43, the rubber tire 40, as shown by the phantom line in FIG. 1 and the solid line in FIG. 2, moves at its abutting portion 40d radially outwardly against the elastic portions 40c, thereby being brought into press-contact with the inner surface 37a of the roller body 37, at which time the chain 56 is always driven, whereby the sprocket 36, tubular member 35 and rubber tire 40 are integrally rotated, the rubber tire 40 also forcibly integrally rotating the roller body 37. Hence, the pallet 63 on the transport route 63, supported between the drive system roller apparatus 30 and the rotatable roller 80 is subjected to a transporting force caused by the forced rotation of the drive system roller apparatus and transported on the transport route 61, at which time a not-driven rotatable roller 80 performs follow-up rotation.

When the solenoid valve 91 is switched to cut off the supply and discharge hose 90 from the supply hose 93, pressure in the rubber tire 40 is released and the abutting portion 40d, as shown by the solid line in FIG. 1 and the phantom line in FIG. 2, moves inwardly by an elastic force of elastic portion 40c so as to move away from the inner surface 37a of the roller body 37. Accordingly, the roller body 37 is not forcibly rotated and its transport operation is stoped.

The transport device 12 comprising the pair of roller conveyers 10 and 11 fundamentally transports a load 47 on the pallet 63 as the above-mentioned, but actually the transport control is performed on the basis of detecting operation and not-detecting operation of pallet 63 by the photoelectronic switch 96. In detail, in the state where the transport route 61 is empty, when the pallet 63 is unloaded from a forklift truck 8 to the group H at the upstream end, the photoelectronic switch 96 is in the detection state, but since that 96 at the group G is in the non-detection state, the control unit 97 and solenoid valve 91 operate to allow the rubber tire 40 to abut against the roller bodies 37 and forcibly rotate them, thereby transporting the pallet 63 from the group H to G.

When the pallet 63 enters into the group G, the photoelectronic switch 96 is in the non-detection state, but the group F is in the non-detection state, so that the rubber tires at the groups G and F abut against the roller bodies so as to transport the pallet 63 from the group G to that F. The pallet 63 thus transported toward the downstream side contacts with the stopper 98 to stop and is stored in the group A, the pallet 63 being detected by the photoelectronic switch 95 to thereby move the rubber tire at the group A away from the roller body 37.

A second pallet 63 is similarly transported and stored in the group B in condition of abutting against the pallet 63 at the group A, at which time the group B detects the pallet 63, but since the group A also is in the detection state, the rubber tire 40 at the group B also moves away from the roller body 37. Thus, in such works, for example, when the pallets 63 are stored at all the groups A through H, all the rubber tires move away from the same. In this state, when the pallet 63 at the group A is taken out by the forklift truck, the photoelectronic switch 96 is in the non-detection state, whereby the rubber tires 40 at the groups A and B abut against the roller bodies so as to transport the pallet 63 at the group B to the group A. Then the photoelectronic switch 96 at the group B is in the non-detection state and the rubber tires 40 at the groups B and C abut against the same to thereby transport the pallet 63 at the group C to the group B. Such repetition of operations sequentially transorts the pallets 63.

In the above-mentioned embodiment, a pair of left-side and right-side roller conveyers 10 and 11 constitute the transport device 12, but one roller conveyor 10 only may alternatively constitute the device 12 by elongating the roller body 37.

Furthermore, the above-mentioned embodiment all the rollers at one roller conveyor 10 are formed of the drive system roller apparatus, but may alternatively be of configuration of disposing one or a plurality of rotatable rollers between respective drive system roller apparatus.

In the above-mentioned embodiment, the transport device comprising the roller conveyors 10 and 11 is built in the shelf frame 1, which may alternatively be formed of floor conveyors installed on the floor.

Figure 7:
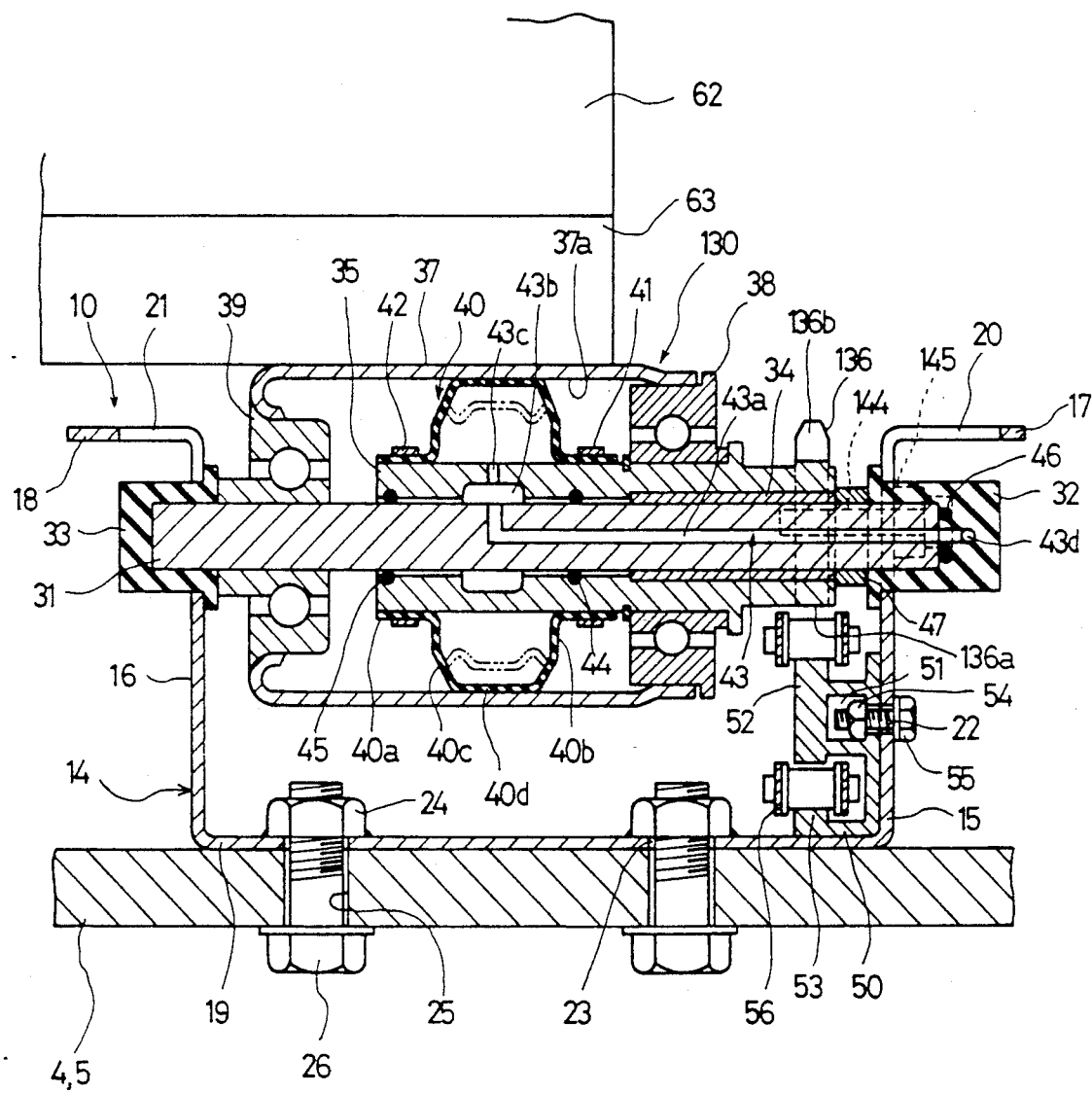
FIG. 7 is a sectional view of a brake device on a basis of a second embodiment of the present invention, when viewed from the front.
Figure 8:
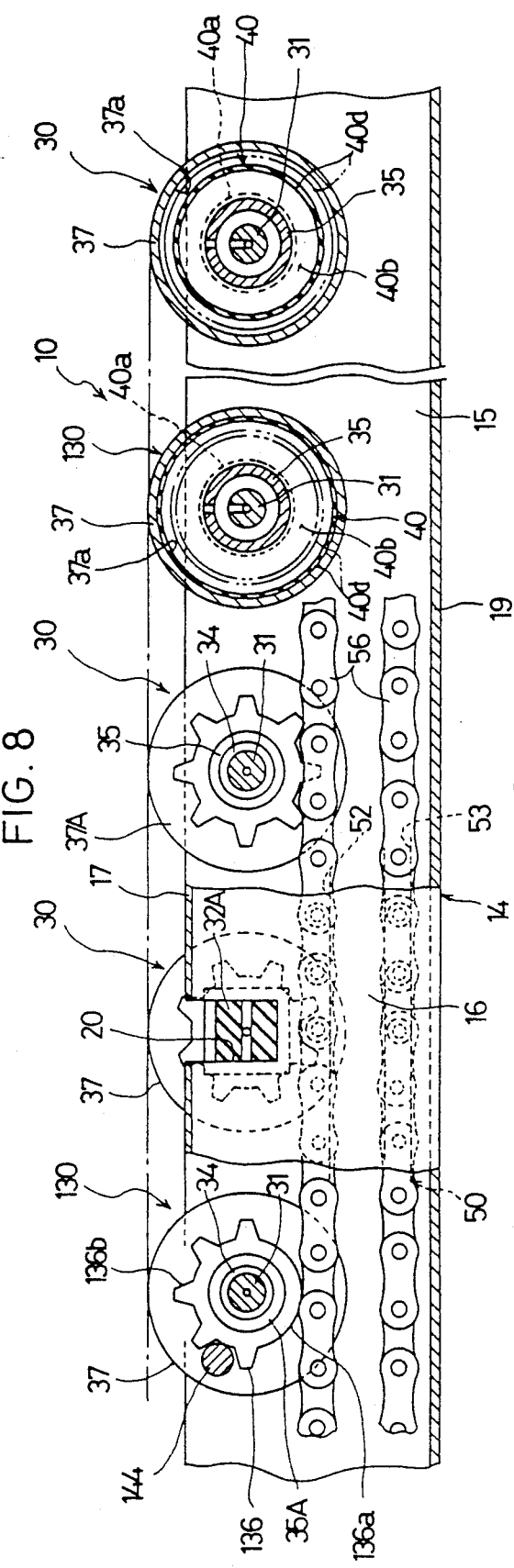
FIG. 8 is a partially cutaway view of a braking device.
Figure 9:
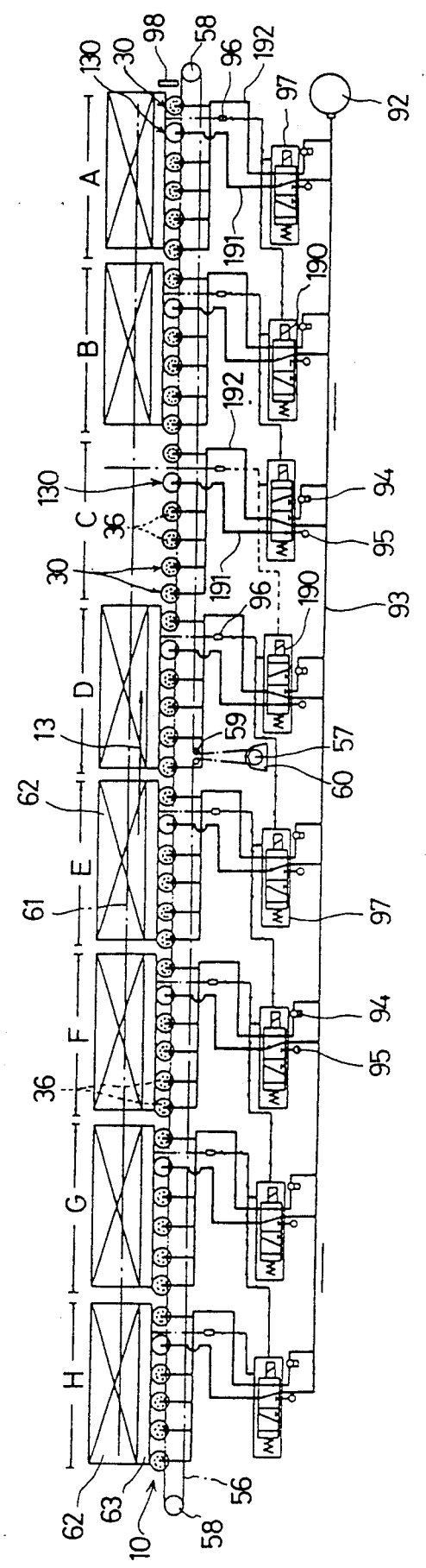
FIG. 9 is a schematic side view explanatory of operation of the braking device.

Next, explanation will be given on a second embodiment of the present invention on reference to FIGS. 7 to 9, in which at the respective groups A through H is provided at least one brake roller device 130 as shown in FIG. 9. At the brake roller device 130, a partially not-toothed sprocket 136, instead of the sprocket in the former embodiment, is provided at the end of tubular member 136a. The partially not-toothed sprocket 136 has at the lower side an about a half circumferential not-toothed portion 136a and at the other half circumferential toothed portion 136b. A stopper engageable between the teeth at the toothed portion 136b is detachably inserted into the support tubular member 145 provided at the side plate 15.

In FIG. 9, a solenoid valve 190 can alternatively operate the brake roller 130 and drive system roller apparatus 30. In detail, at the respective groups A through H are provided a first supply and discharge hose 191 connected to a pipeline passage 43d at the brake roller 130 and a second supply and discharge hose 192 connecting in series a pipeline passage 43d at the drive system roller apparatus 30. The supply and discharge hoses 191 an 192 are connected to a common supply hose 93 from a fluid supply source 92 in relation of being capable of communicating and cutting off. In such construction, when the solenoid valve 190 is switched to connect the supply hose 93 to the second supply and discharge hose 192, the drive system roller apparatus 30 operates to transport a load 62, at which time the first supply and discharge hose 191 is released. At the brake roller device, as shown by the phantom lines in FIGS. 7 and 8, pressure in the rubber tire 40 is released in the atmosphere, whereby the abutting portion 40d at the rubber tire 40 leaves the inner surface 37a of roller body 37 by means of the elastic force of the elastic portions 40c. Accordingly, the roller body is not braked and carries out the same rotation as the rotatable roller 80. This state is shown at the groups C and D in FIG. 9.

In the groups A, B, E, F, G and H in FIG. 9, the solenoid valve 91 is switched to connect the supply hose 93 to the first supply and discharge hose 191, at which time in the drive system roller apparatus, the rubber tire leaves the inner surface 37a of the roller body 37, whereby the roller body 37 is not rotatably driven. On the contrary, at the brake roller device 130, the rubber tire 40 is pressurized therein so as to come into press-contact with the inner surface 37a of the roller body 37, thereby exerting the braking action on the roller body 37 and stopping it. In detail, since the stopper 144 supported at the side plate 15 engages with between the teeth of the toothed portion 136b at the partially not-toothed sprocket 136, the sprocket 136 is restrained from rotation so that this restraint is transmitted to the roller body 37, thereby exerting the braking action onto the load 62.

In the above-mentioned embodiment, the tubular member 35 is rotatably fitted onto the roller shaft 31 and the rubber tire 40 is mounted to the tubular member 35. Alternatively, a roller shaft 31 may be rotatably supported to the conveyor frame 14 and the sprocket 36 and rubber tire 40 may be mounted to the roller shaft 31.

In the above-mentioned embodiment, all the rollers at one roller conveyor 10 comprise the drive system roller apparatus 30 and brake roller devices 130. Alternatively one or a plurality of rotatable rollers may be disposed between the drive system roller apparatus 30 or the brake roller devices each other.

Figure 10:
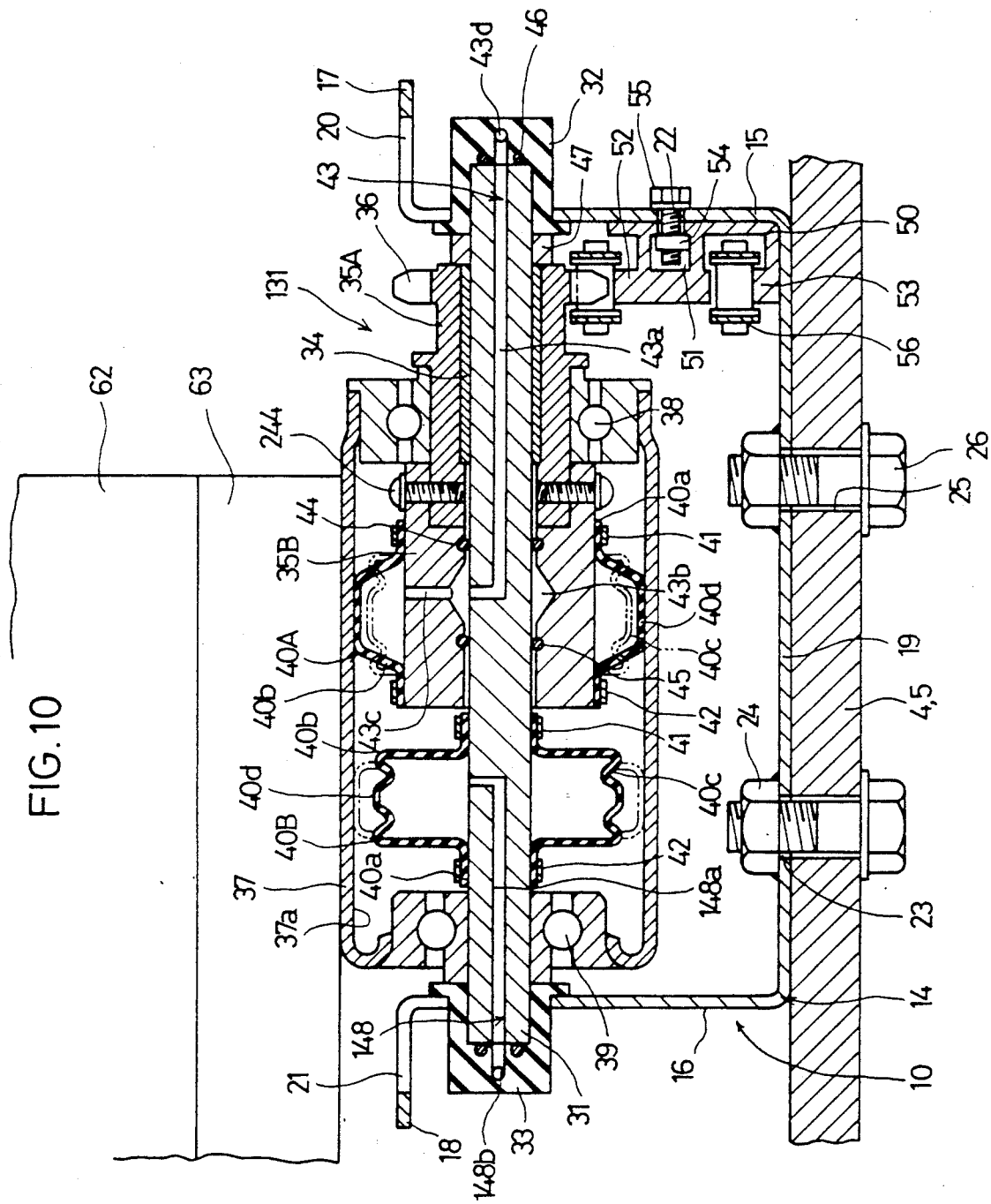
FIG. 10 is a sectional view of a third embodiment of a drive system apparatus of the invention, when viewed from the front.
Figure 11:
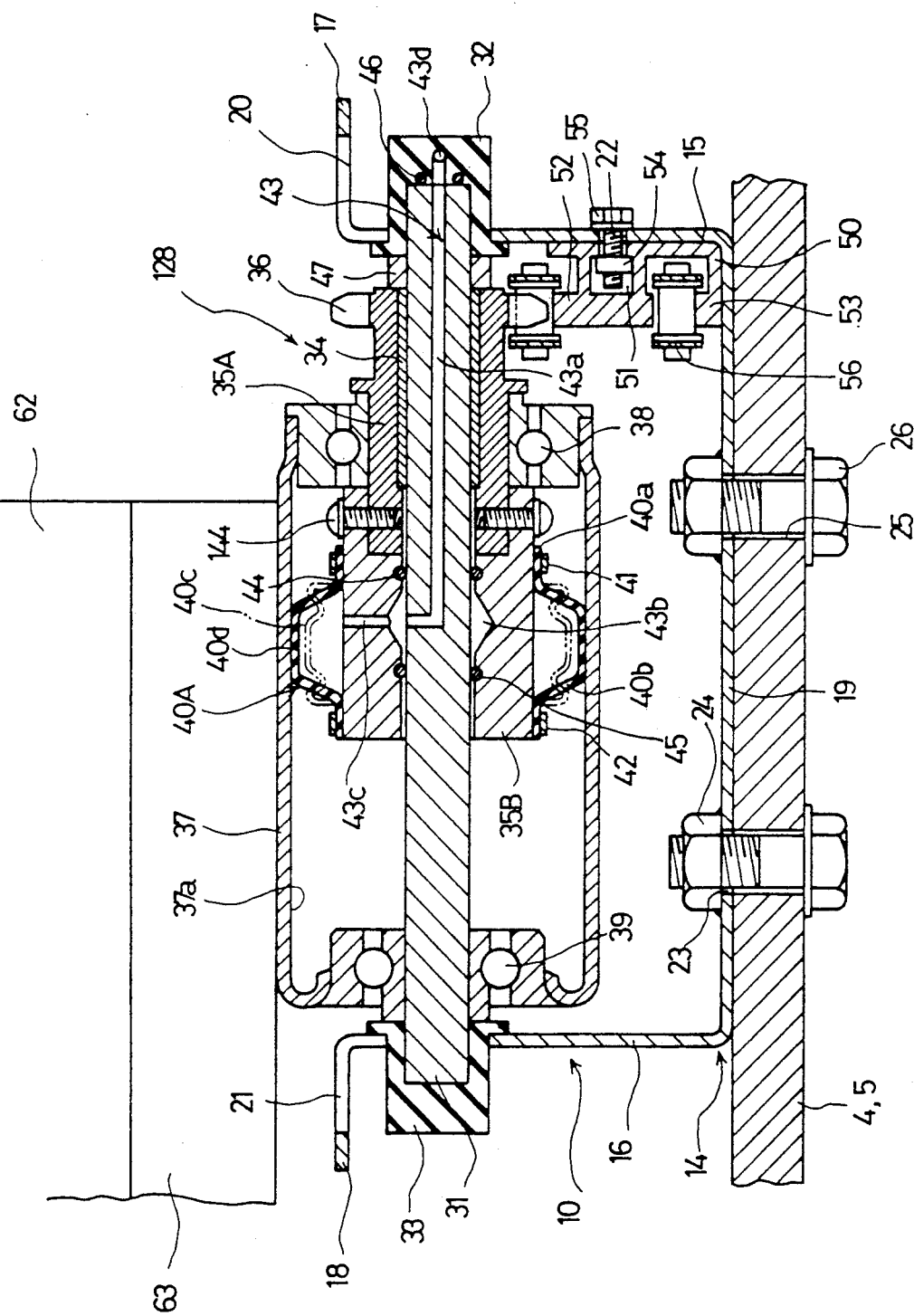
FIG. 11 is a sectional view of a fourth embodiment of a drive system roller apparatus of the invention, when viewed from front.

FIG. 10 shows a roller device with a brake on the basis of a third embodiment of the present invention, and FIG. 11 shows a non-brake roller device 131 on the basis of a fourth embodiment of the present invention.

In the roller device with brake 131 shown in FIG. 10, a first tubular member 35a is rotatably fitted onto the roller shaft 31 through a bush 34, a sprocket 36 is integrally formed at one end of the first member 35a. In a roller body 37 is provided a second tubular member 35b across the roller shaft 31 and the first tubular body 35a, both the tubular members 35a and 35b being integral by bolts 244. A bearing 38 is fitted on the first tubular member 35a.

A first rubber tire 40A is fitted onto the outer periphery of the second tubular member 35b between both the bearings 38 and 39, and a second rubber tire 40B is fitted onto the roller shaft 31 between the second tubular member 35B and the bearing 39. The roller shaft 31 is not-rotatably supported to the conveyor frame 14 through caps 32, 33.

A fluid supply and discharge conduit 43 is constructed as the same as that described in the former embodiment, where an annular passage 43b is formed at the inner periphery of the second tubular member 35B. A fluid supply and discharge conduit 148 for the second rubber tire 40B is formed at part of the roller shaft 31 at the reverse side to the fluid supply and discharge conduit 43 and has an axis passage 148a formed at the roller shaft 31 and communicating with the second rubber tire 40B and a pipeline passage formed at a cap 33 so as to communicate with the axis passage 148a.

In such construction, the first rubber tire 40A can rotatably drive the roller body 37 and the second rubber tire 40B can exert the braking action onto the roller body 37 by the second rubber tire 40B. In detail, the fluid supply and discharge conduit 43 for the first rubber tire 40A and fluid supply and discharge conduit 148 for the second rubber tire 40B are alternatively communicated with a fluid supply source and either one rubber tire is expanded, so that the roller device shown in the drawing can be selectively functioned as either the drive system roller apparatus or the brake roller device, which selection can be carried out by pipeline construction about the same as shown in FIG. 9.

Thus, the first rubber tire 40A for driving the roller body 37 and the second rubber tire 40B for braking the same are together built in the one roller body 37, so that the entire apparatus can be not-bulk and compact, thereby preventing a foreign object from entering into the torque transmitting portion or the brake portion.

As the same as in FIG. 9, it is preferable that at least one roller device 131 with brake is disposed at the respective groups A through H and the remainder is composed of the drive system roller apparatus in FIG. 1 and the non-brake roller device 128 shown in FIG. 11.

The non-brake roller device 128 in FIG. 11 is constructed as the same as the roller device with brake, but does not include the second rubber tire 40B or the fluid supply and discharge conduit 148.

Figure 12:
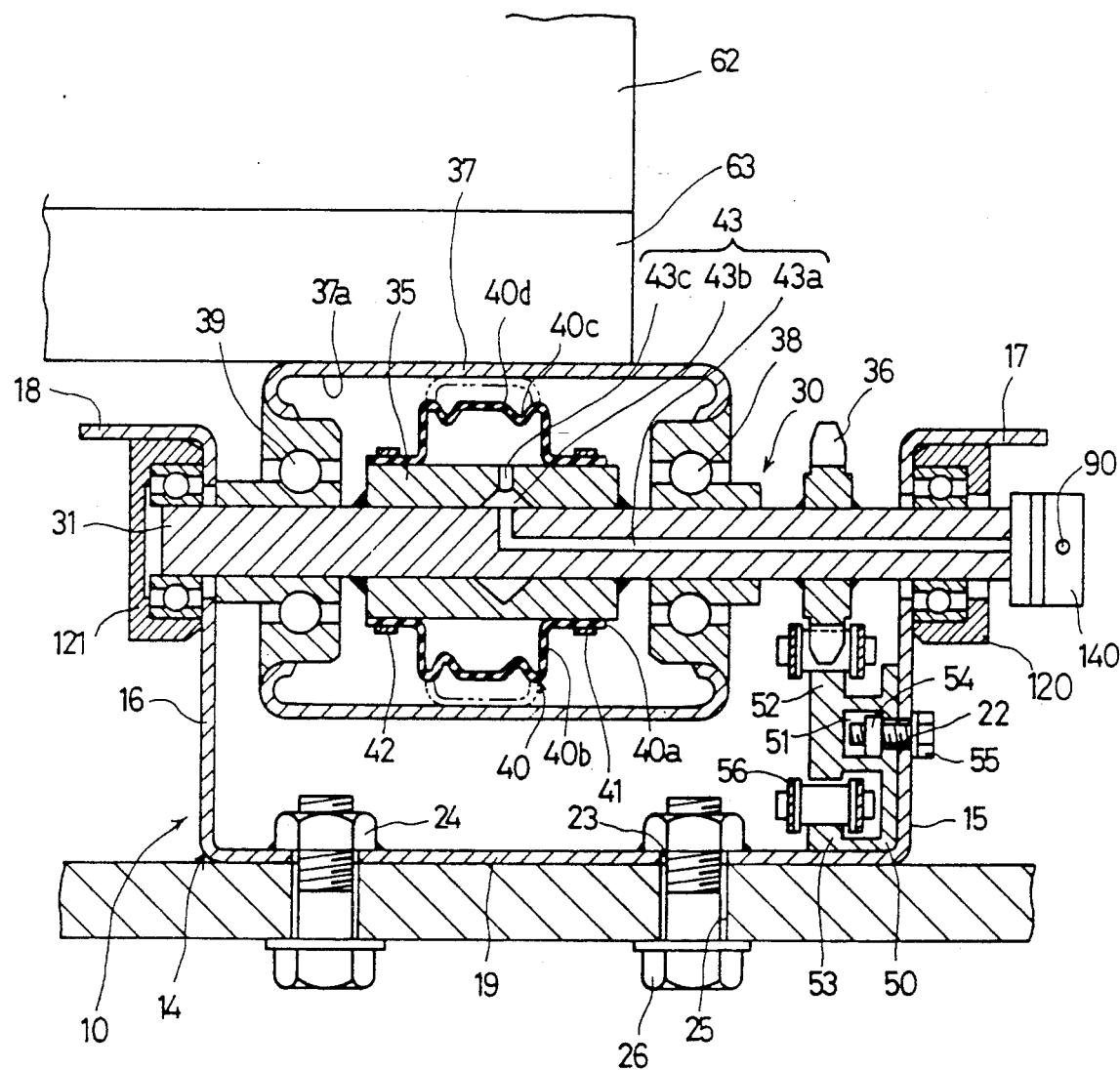
FIG. 12 is a sectional view of a fifth embodiment of a drive system roller apparatus of the invention, when viewed from the front.
Figure 13:
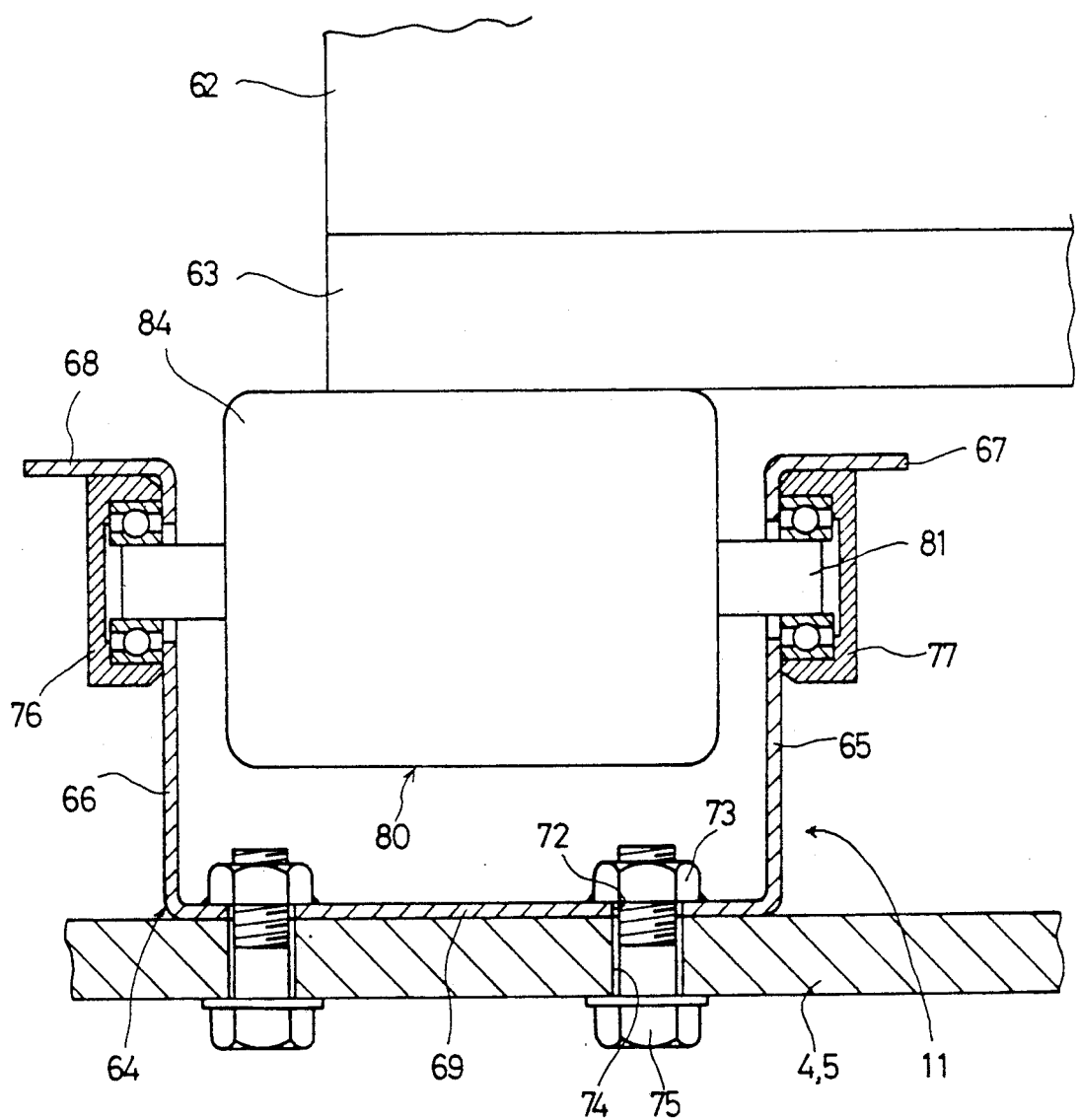
FIG. 13 is a front view of a free-rotatable roller in a pair with the drive system roller apparatus in FIG. 12.

FIGS. 12 and 13 show a fifth embodiment of the present invention. In FIG. 12, bearings 120 and 121 are provided on both side plates 15 and 16 of the conveyor frame 14 at the roller conveyor 10. A drive system roller apparatus 30 is supported at both axial ends to the bearings 120 and 121, so that the roller shaft 31 is rotatably supported to the conveyor frame 14. A sprocket 36 is integrally provided at one end of the roller shaft 31, a roller body 37 being rotatable around the roller shaft 31 through bearings 38 and 39. A tubular member 35 is fixedly fitted on part of roller shaft 31 and a rubber tire 40 is fixedly fitted to the tubular member 35. A fluid supply and discharge conduit 43 is constructed as the same as the former embodiments, but communicates with a supply and discharge conduit 90 through a rotary joint 140.

FIG. 13 shows a roller conveyor 11 of not-drive system as the same as FIG. 3, in which, as the same as the drive system roller conveyor 10 shown in FIG. 12, bearings 76 and 77 are provided at the outer surfaces of both side plates 65 and 66 at the conveyor frame 64. A rotatable roller 80 is supported at both axial ends thereof to the bearings 76 and 77, thereby rotatably supporting a roller shaft 81 to the conveyor frame 64.

In such construction, the roller 31 rotates through the sprocket 36 engaging with the chain 56. Also, when the rubber tire 40 integrally rotatable with the roller shaft 31 through the tubular member 35 abuts against the inner surface 37a of roller body 37, the roller body 37 also is forcibly integrally rotated. Hence, a pallet 63 supported by the drive system roller apparatus and rotatable roller 80 is transmitted, at which time the rotatable roller 80 of non-drive system performs follow-up rotation.

As shown in FIG. 12, since the sprocket 36 is directly integrally mounted to the roller shaft 31, in comparison with the case where the tubular member 35 mounting thereon the sprocket 36 is fitted on the roller shaft 31, which portion is easy to manufacture and is expected to be smaller in weight.

In the above-mentioned embodiment, the sprocket 36 integrally fixed to the roller shaft 31 is driven by the chain 56, but, for example, a round belt may be used, a drive shaft and a trapezoid roller may be combined, or a drive shaft and a bevel gear may be combined.

Figure 14:
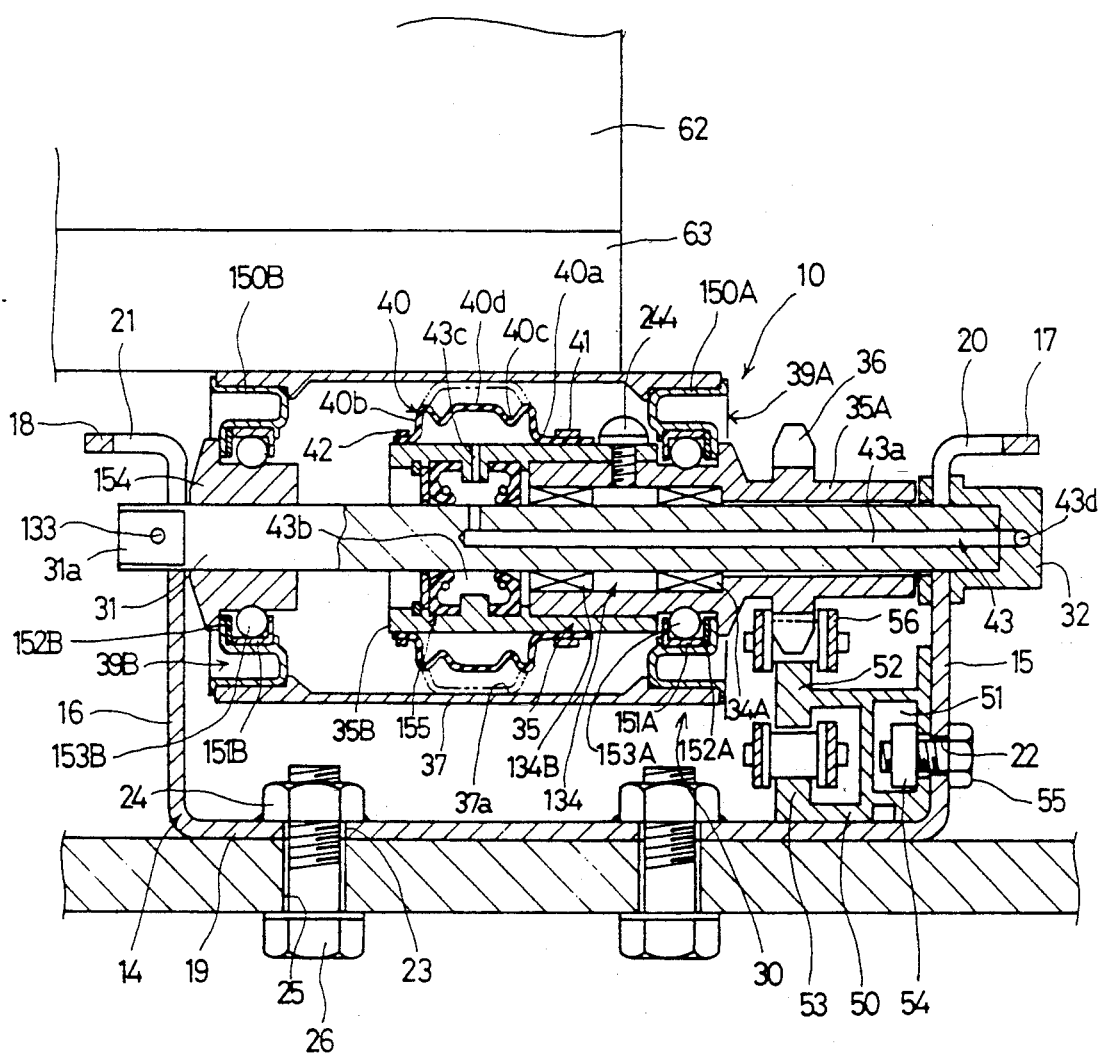
FIG. 14 is a sectional view of a sixth embodiment of a drive system roller apparatus of the invention, when viewed from the front.
Figure 15:
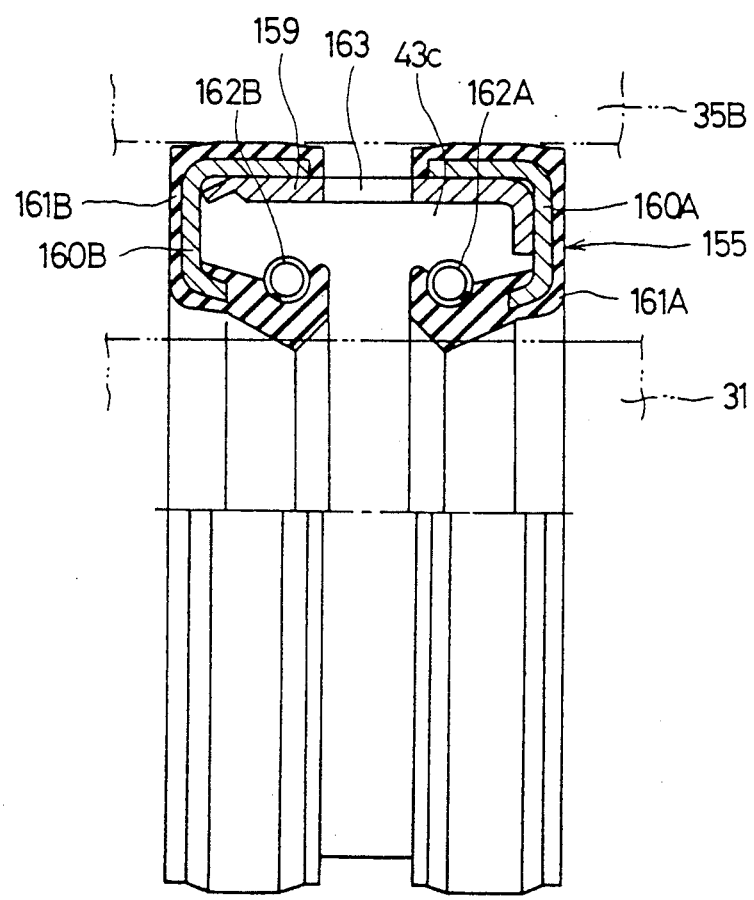
FIG. 15 is an enlarged detail view of a sealing device in FIG. 14.
Figure 16:
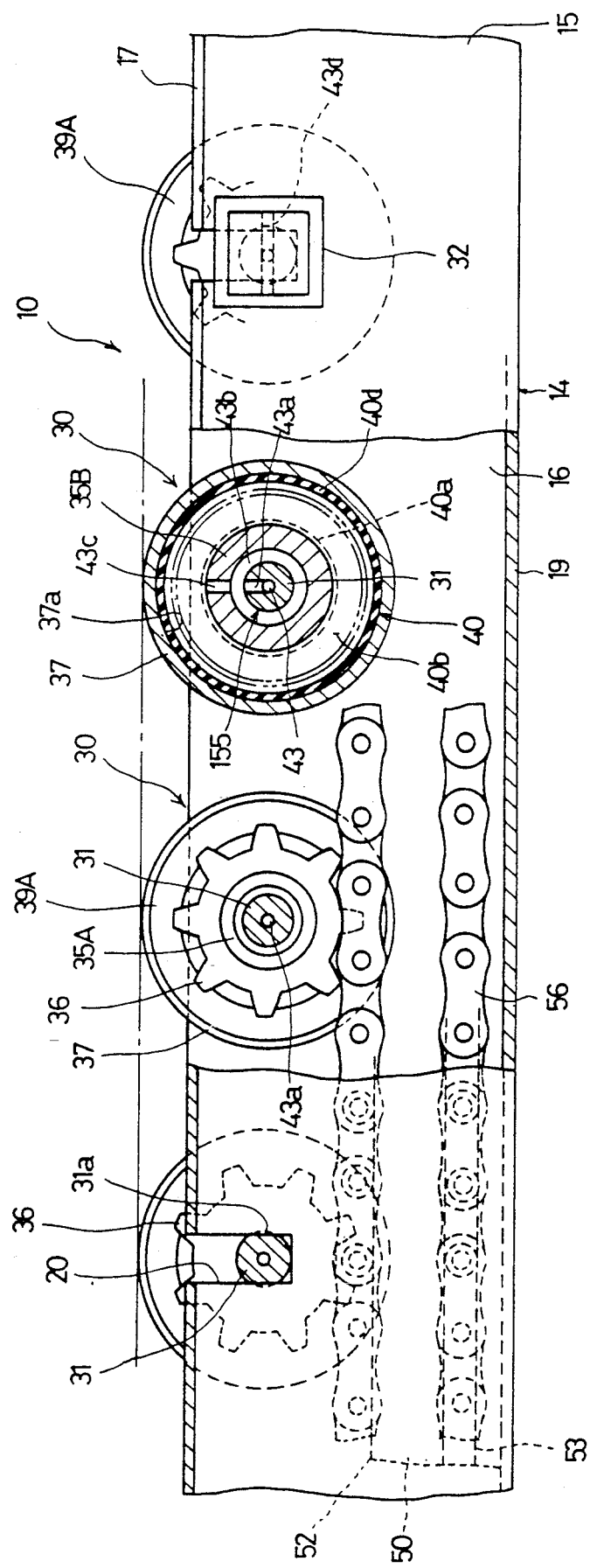
FIG. 16 is a partially cutaway view of the drive system roller apparatus in FIG. 14.

FIGS. 14 through 16 show a sixth embodiment of the invention, in which parallel portions 31a are formed at both axial ends of roller shaft 31 at the drive system roller apparatus so that the parallel portions 31a are dropped from above into cutouts 20 and 21, whereby the roller shaft 31 is supported to the roller conveyor frame 14 in relation of being not rotatable. One end of roller shaft 31 is covered by a cap 32 of hard rubber and at the other end is mounted a spring pin 133. A tubular member 35 is rotatably fitted onto the roller shaft 31 through a bearing 134. The bearing 134 is formed of a pair of needle bearings 134A and 134B disposed axially of the shaft 31, the tubular member 35 comprising a first tubular member 35A supported to the bearing 134 and a second tubular member fitted on the first tubular member 35a and integrally fixed thereto by a bolt 244.

The sprocket 36 is integrally provided at one end of the first tubular member 35, and a roller body 37 is fitted across an intermediate portion of the first tubular member 35A and the other end of roller shaft 31, so as to be rotatably supported by a pair of bearings 39A and 39B. The bearings 39A and 39B comprises annular casing 150A and 150B fitted into both ends of the roller body 37 and fixed thereto and a large number of balls 153A and 153B disposed at the inner peripheral side through external rings 151A and 151B and side plates 152A and 152B. One-side balls 153A are brought into contact with the outer periphery of the first tubular member 35A and the other-side balls 153B are brought into the outer periphery of a ring member 154 fitted onto the roller shaft 31 and fixed thereto. The rubber tire 40 is fitted onto the second tubular member 35B between both the bearings 39A and 39B.

A sealing device 155 is interposed between the roller shaft 31 and the second tubular member 35B in order to form an annular passage 43b of part of a fluid supply and discharge conduit 43. As shown in FIG. 15, the sealing device 155 comprises a metallic annular plate 159, a metallic annular members 160A and 160B of L-like shape in section fixed to the both ends of the annular plate, packing materials 161A and 161B fixed to the outer side surfaces of the annular materials 160A and 160B and opposite at the inner free ends to the annular plate 159, and springs 162A and 162B annularly disposed at the inner surface of the free ends of the packing materials 161A and 161B. The packing materials 161A and 161B are fitted in and fixed to the second tubular 35B, and the free ends of the packing materials 161A and 161b are brought into press-contact with the outer surface of the roller shaft 31 by elastic forces of the springs 162A and 162B resectively. At the annular plate 159 is formed a through bore 163 through which the annular passage 43b communicates with the tubular passage 43c.

The tubular member 35 smoothly and stably rotates through the bearing 134, the roller body 37 also smoothly and stably rotating through the bearings 39A and 39B. The sealing device 155 integrally rotates with the roller body 37 and the packing materials 161A and 161B slidable-contact at the free ends with the roller shaft 31, at which time the packing materials 161A and 161B are brought into press-contact with the outer surface of roller shaft 3, whereby there is no fear that an operating fluid, such as air, leaks from the border of the rotary part and not-rotary part, that is, between the axis passage 43a and the annular passage 43b.

In such construction, the tubular member 35 and bearing 134 are provided so that strength of the entire apparatus can be improved and transportation and stop thereof can smoothly and stably be carried out. Furthermore, the sealing device 155 can prevent the fluid from leaking from the fluid supply and discharged conduit 43 through the border of the rotating portion and not-rotating portion, thereby expecting always reliable operation.

Figure 17:
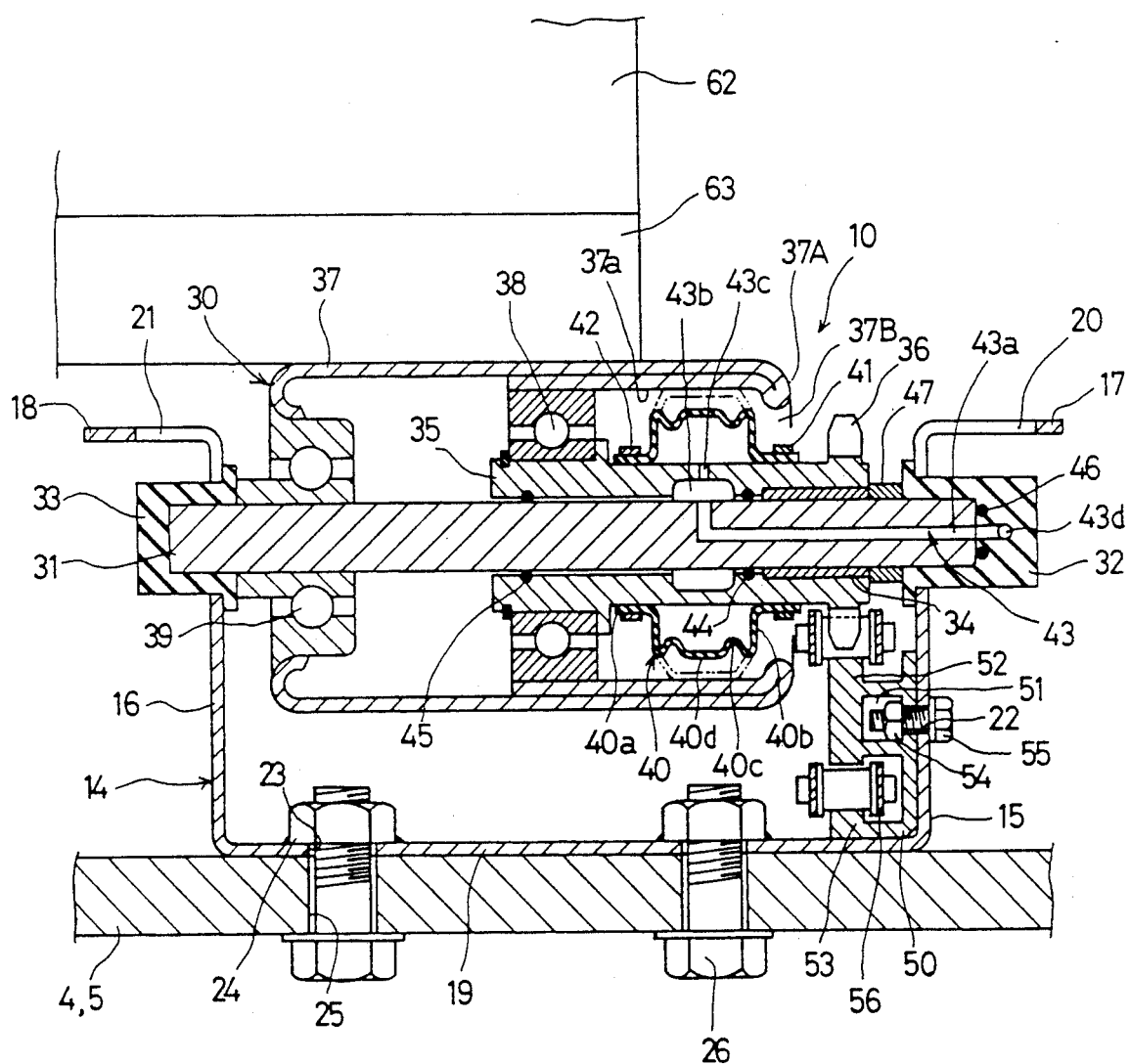
FIG. 17 is a sectional view of a seventh embodiment of a drive system roller apparatus of the invention, when viewed from the front.

FIG. 17 shows a seventh embodiment of the present invention. A roller body 37 is rotatably supported to a roller shaft 31 through a bearing 38 provided between the roller body 37 and a tubular member 35 and a bearing provided between the same and the roller shaft 31. Part of the roller body 37 at the sprocket 36 side is folded inwardly so that the bearing 38 supports the inner end of the folded part, thereby supporting the roller body 37 at its intermediate portion. At the fold is formed a restriction 37A, so that the rib effect by the restriction 37a increase strength of the fold and an opening 37B is formed in the restriction 37A. A rubber tire 40 press-contactable with or removable from the inner surface 37a of the roller body 37 is provided at the outer periphery of tubular member 35 toward the opening end side of the roller body 37 rather than the bearing 38.

In such construction, the rubber tire 40 can be inspected from the lateral side through an opening 37B, thereby facilitating confirmation of breakage or wearing. When rubber tire 40 is required to be repaired or renewed, after the drive system roller apparatus 30 is removed from the conveyor frame 14, the rubber tire 40 may be taken out from the roller body 7 and passed over the outer periphery of sprocket 36 so as to be taken out from the roller shaft 31, whereby by the rubber tire 40 is easy to repair and inspect.

Figure 18:
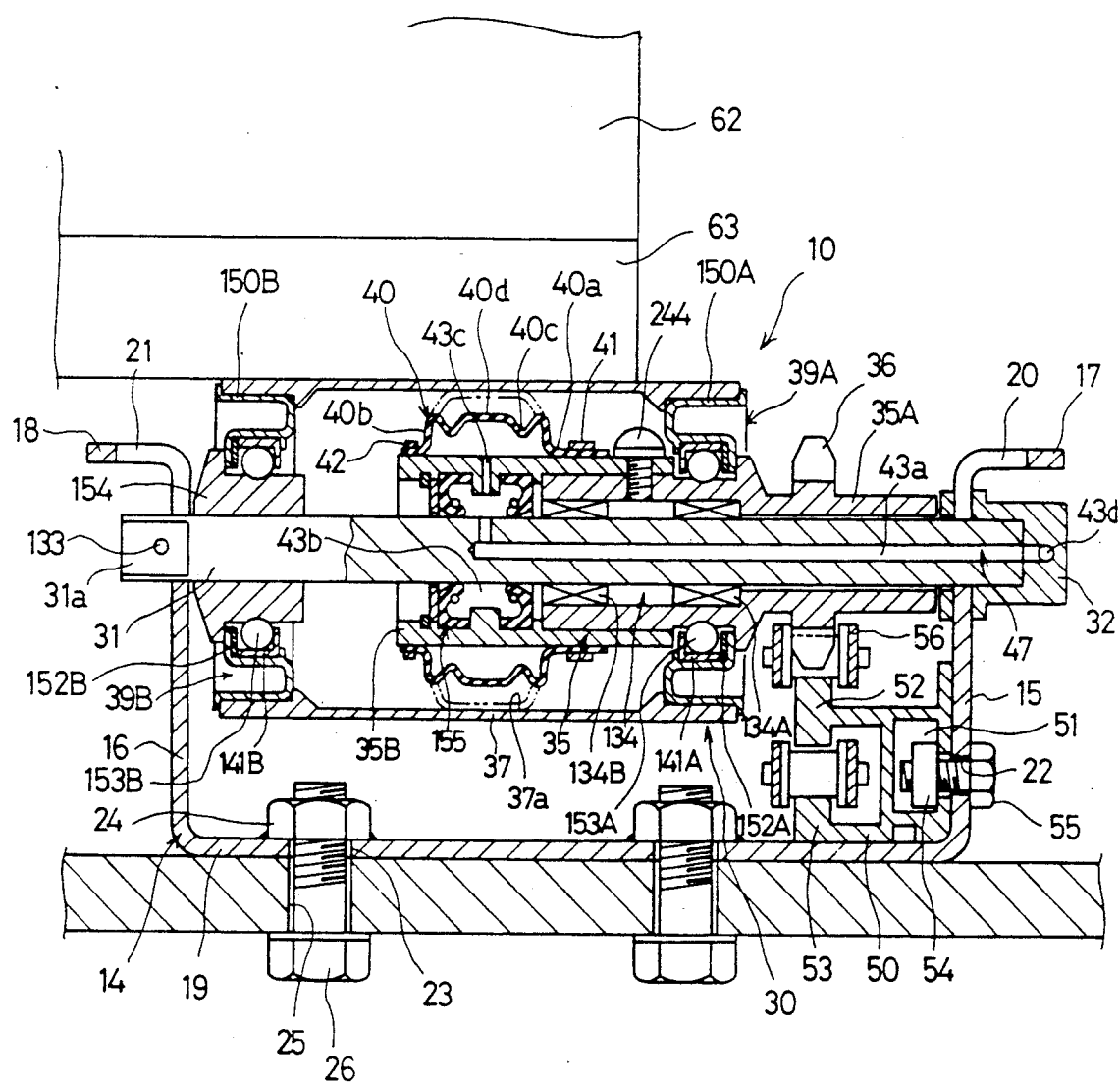
FIG. 18 is a sectional view of a eighth embodiment of a drive system roller apparatus, when viewed from the front.
Figure 19:
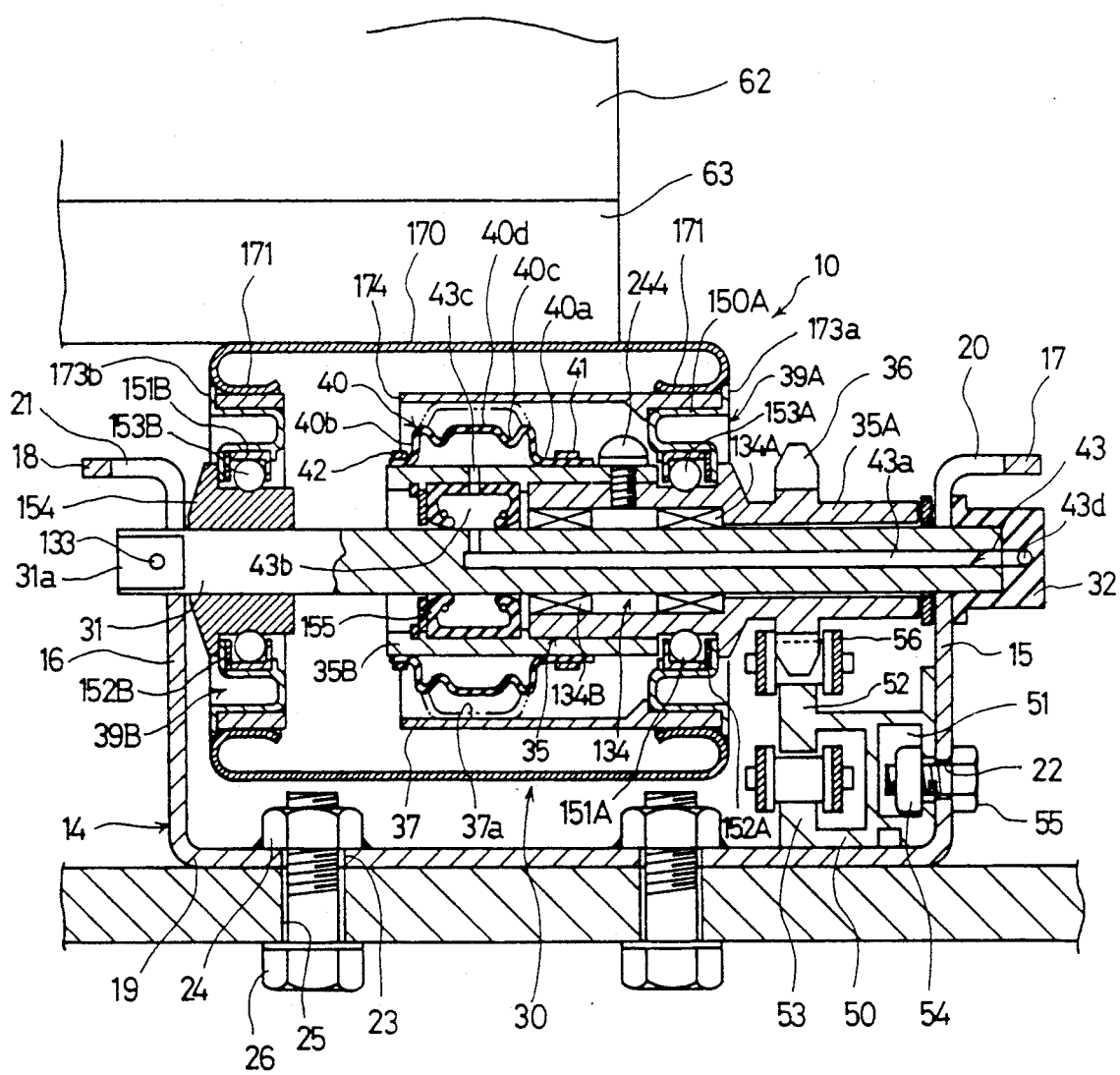
FIG. 19 is a sectional view of the drive system roller apparatus in FIG. 18, in the state where a larger diameter body is mounted to a roller body of the apparatus, when viewed from the front.

FIGS. 18 and 19 show a eighth embodiment of the present invention. In FIG. 18, a roller body 37, as the same as the sixth embodiment, is fitted on the first tubular member 35A across an intermediate portion thereof and an end of roller shaft 31 at the side plate 16 side and rotatably supported through a pair of bearings 39A and 39B.

FIG. 19 shows the state where a larger diameter body 170 is fitted on the roller body 37 and fixed thereto, that is, the larger diameter body 170 is cylindrical and provided at both axial ends with an elastic abutting portion 171. The larger diameter portion 170 is fitted on the roller body 37 against elasicity of elastically abutting portion 171, whereby both the members 37 and 170 are integral with elastic force of elastically abutting portion 171. Such integration may be rigid by welding.

When the annular casings 150A and 150B at the bearings 39A and 39B having flanges 173a and 173b for positioning are used, the roller body 37 may be cut into lengthwise so that two-divided roller bodies 37 may be press-fitted into the larger diameter body 170 from both the axial ends thereof respectively. In addition, reference numeral 174 designates a cut portion of the larger diameter portion 170.

Incidentally, a rotatable roller (not shown) in pair of the drive system roller apparatus 30 may use a roller body of diameter corresponding to that of the larger diameter body 170.

When the roller is made larger in diameter, the drive system roller apparatus 30, which is integrated by fitting the larger diameter body 170 onto the roller body 37, is built in the conveyor frame 14, whereby a pallet 63 can be transported at high speed through the larger diameter body 170 integrally rotatable with the roller body 37.

Thus, when a larger diameter roller is intended to be used, the drive system roller apparatus 30, which fixedly inserts the larger diameter body 170 of a target diameter onto the roller body 37, may be built in the conveyor frame 14. Therefore, the principal components, such as the roller shaft 31, rubber tire 40 and roller body 37, are usable in common and also only larger diameter bodies 170 of various diameters are prepared so that the above components may be economically diverted.

FIGS. 20 through 24 show a ninth embodiment of the present invention, in which a roller conveyor 10 has one drive system roller apparatus 30 and a large number of rotatable rollers 180, and the roller body 37 of drive system roller apparatus 30, as the same as the former embodiment, is rotatably supported to a roller shaft 31 through a pair of bearings 39A and 39B.

Figure 20:
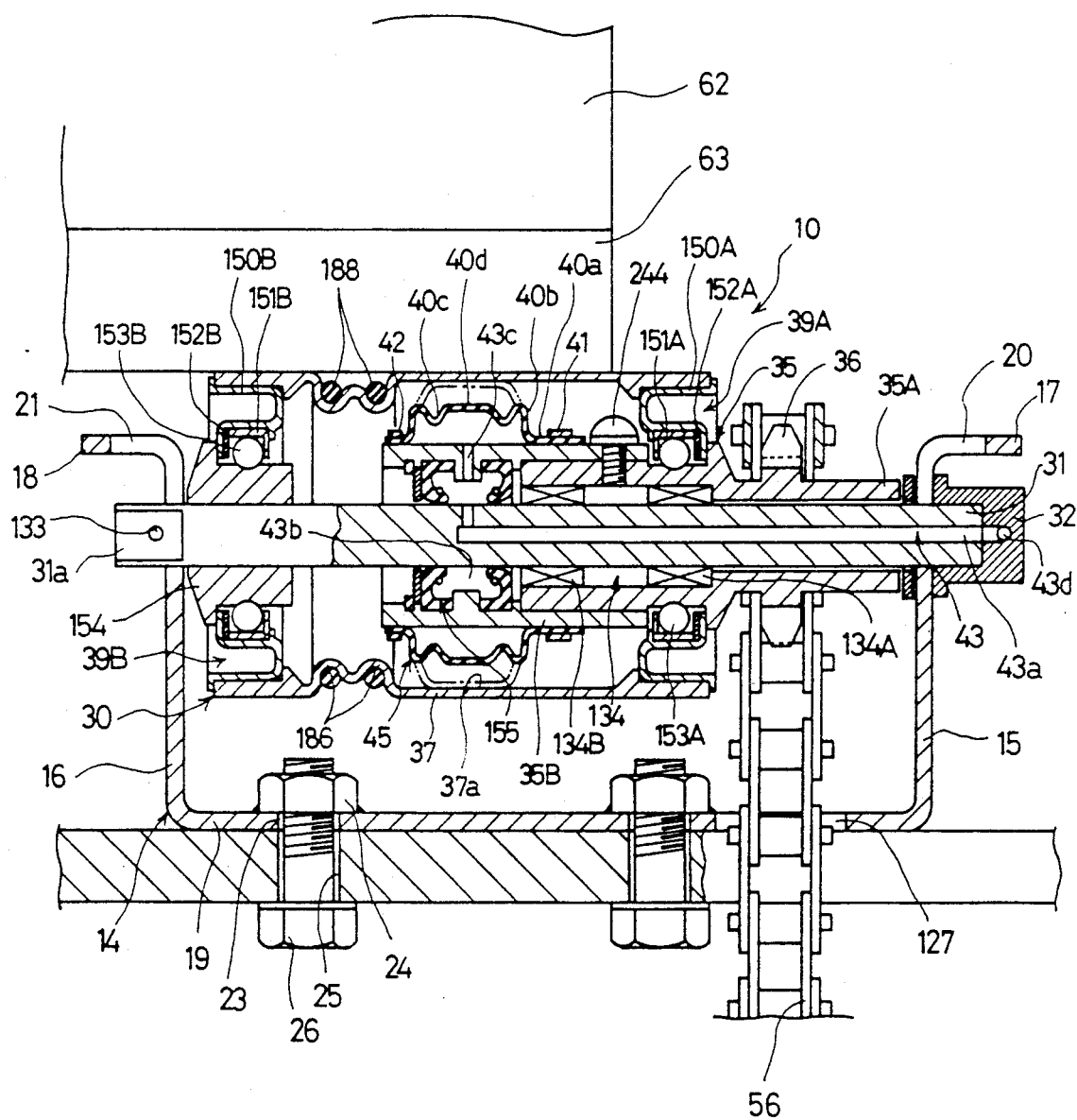
FIG. 20 is a sectional view of a ninth embodiment of a drive system roller apparatus of the invention, when viewed from the front.
Figure 21:
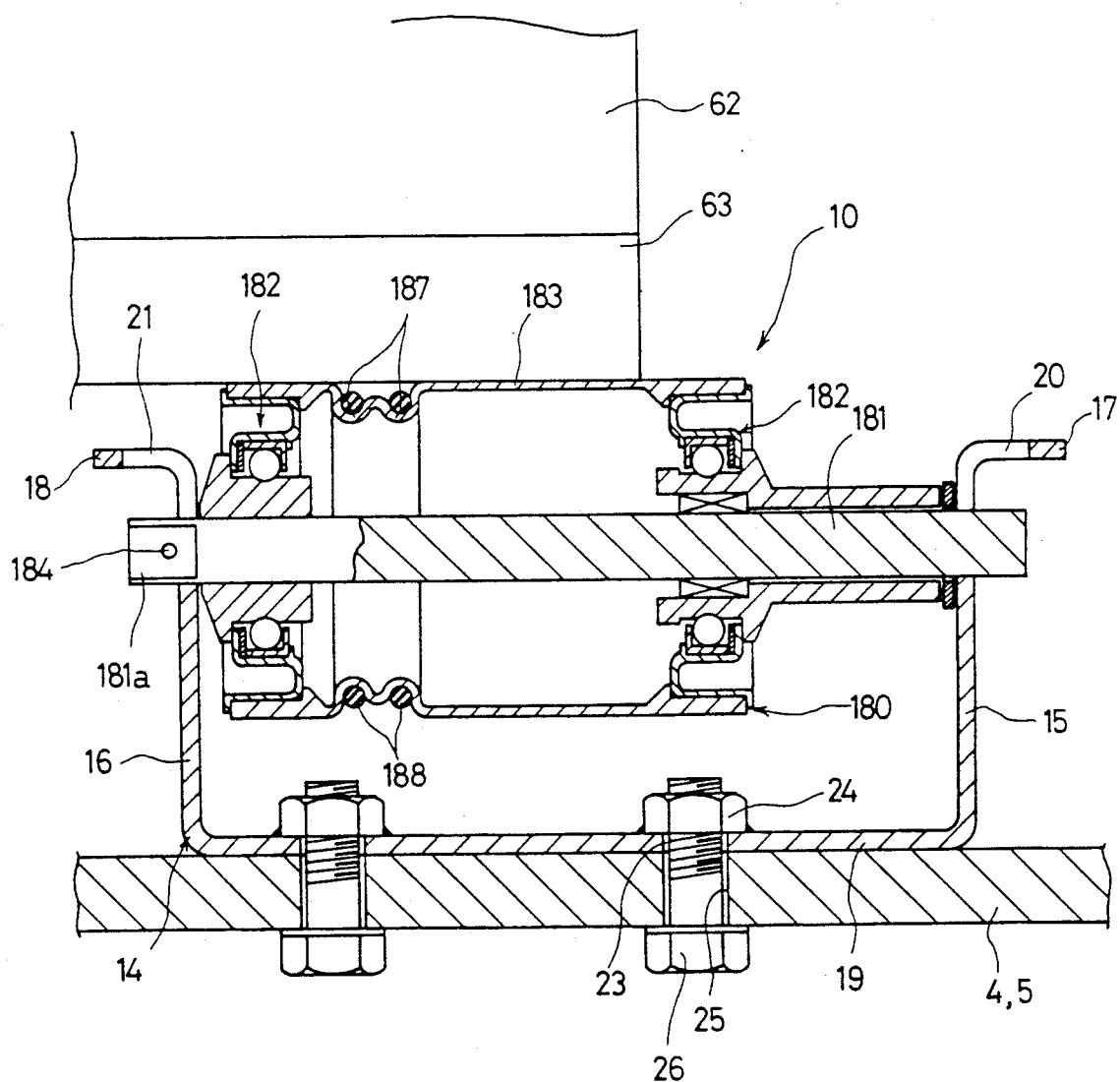
FIG. 21 is a sectional view of a free-rotatable roller in association with the drive system roller apparatus in FIG. 20, when viewed from the front.
Figure 22:
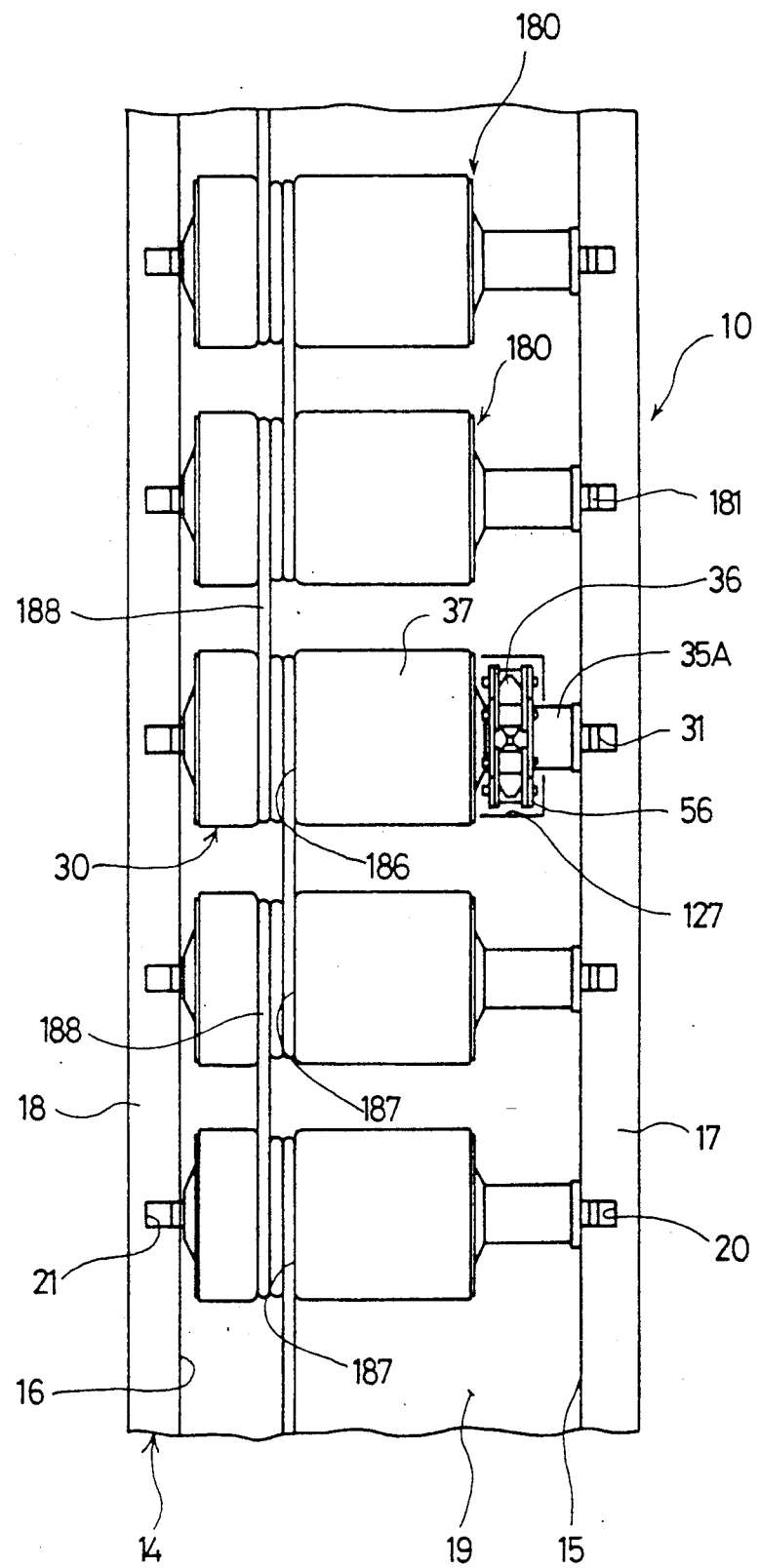
FIG. 22 is a plan view of the drive system roller apparatus in FIG. 21 and a principal portion of a roller conveyor using the free-rotatable roller in FIG. 21.
Figure 23:
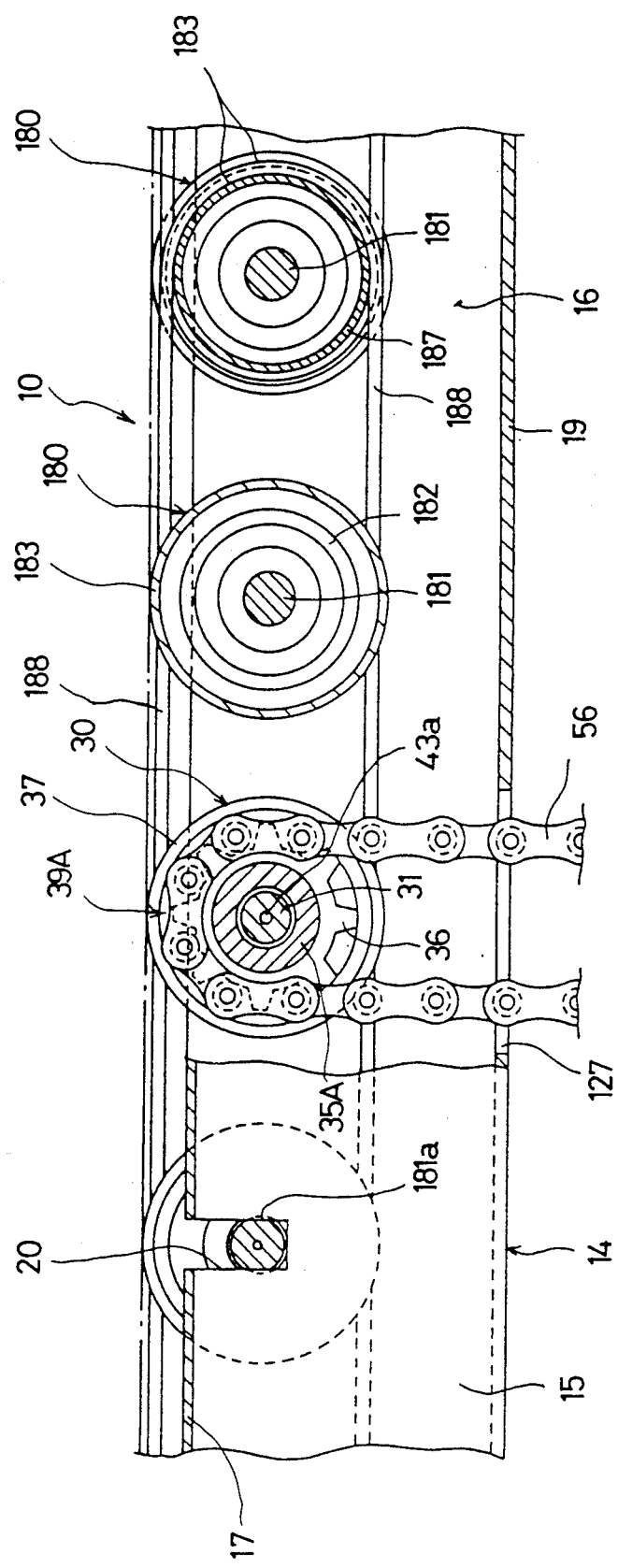
FIG. 23 is a partially cutaway of the roller conveyor in FIG. 22.
Figure 24:
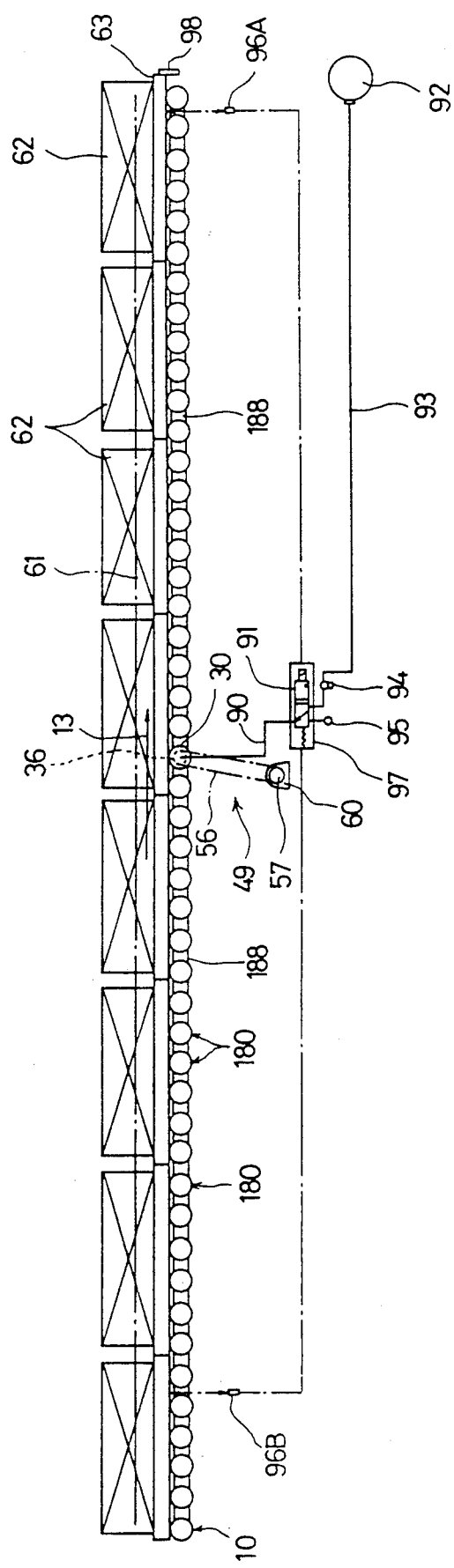
FIG. 24 is a schematic side view explanatory of operation of the roller conveyor.

As shown in FIG. 24, a drive device 49 in association with a sprocket 36 has a motor 60, a driving sprocket 57 mounted to an output shaft of the motor 60 and a chain 56 stretched across the driving sprocket 57 and sprocket 36. As shown in FIGS. 20 and 23, the chain 56 passes a through bore 127 formed at a base plate 19 of conveyor frame 14.

As shown in FIGS. 21 through 24, a rotatable roller 180 has a roller shaft 181, and a roller body 183 rotatably fitted onto the roller shaft 181 through a bearing 182 or the like. After parallel portions 181a formed at both ends of roller shaft 181 are dropped from above into cutouts 20 and 21, a spring pin 184 is operated to support the roller shaft 181 to the conveyor 14 in the state of not-rottable state.

As shown in FIGS. 20 through 23, a pair of annular recesses 186 are formed at the outer periphery of roller body 37 at the drive system roller apparatus 30 and similarly a pair of annular recesses 187 are formed at the outer periphery of roller body at the rotatable roller 180. Endless round belts 188 are wound between the adjacent annular recesses 186 and 187 to thereby connect the rollers 180 in association with each other.

The other roller conveyor 11 (not shown) is constructed as the same as described in the former embodiment.

A transportation device 12 comprising a pair of roller conveyors 10 and 11, for example, as shown in FIG. 24, a pallet 63 abuts against a stoper 8 provided at the downstream side end of the transportation route 61, whereby loads 62 are sequentially storaged from the downstream side to the upstream side. When the pallet 63 at the downstream side is removed by being taken out and a photoelectronic switch 96A at the downstream side is in the non-detection state, or when the pallet is taken in so as to put a photoelectronic switch 96B in the detection state, a rubber tire 40 at the drive system roller apparatus abuts against the roller body 37 by operation of a control unit 97 for a predetermined time period.

Next, explanation will be given on storage and transportation of a load 62.

When the rubber tire 40 expands to come into press-contact with the inner surface of roller body 37, the roller body 37 is rotatably driven by a driving force from the chain 56. This torque is sequentially transmitted to the rotatable rollers 180 through the round belts 188, so that one roller conveyor 10 is driven throughout its entire length. On the contrary, when the rubber tire 40 leaves the inner surface 37a of roller body 37, the transportation is stopped.

The transport device 12 comprising a pair of conveyors 10 and 11 basically transports the load 62 on the pallet 63, and actually the transport control is performed on the basis of whether or not the photoelectronic switchs 96A and 96B detect the pallet 63. In detail, in the state where the transport route 61 is empty, when a fork lift truck or the like unloads the pallet 63 on the transport route 61, the photoelectronic switch 96B operates detection, so that the roller conveyor 10 is rotatably driven for a set time period. Therefore, the pallet 63 is transported toward the downstream side and abuts against a stopper 98 so as to stop and is stored at the downstream side end. A second pallet 63 is similarly transported and abuts against the pallet 63 at the downstream side and stored at the upstream side thereof, thus storing a number of pallets 63.

When the fork lift truck takes out the pallet 63 at the downstream side, the photoelectronic switch 96a is put in the state of non-detection, so that the roller conveyor 10 is rotatably driven for the set time period only, thereby transporting other pallets in the storage state toward the downstream side.

Thus, the round belts 188 are used to transmit power to the rotatable roller 180 so as to drive the roller conveyor 10 throughout the entire length thereof, whereby miniaturization of a drive source or reduction of noises when operation can be expected.

Figure 25:
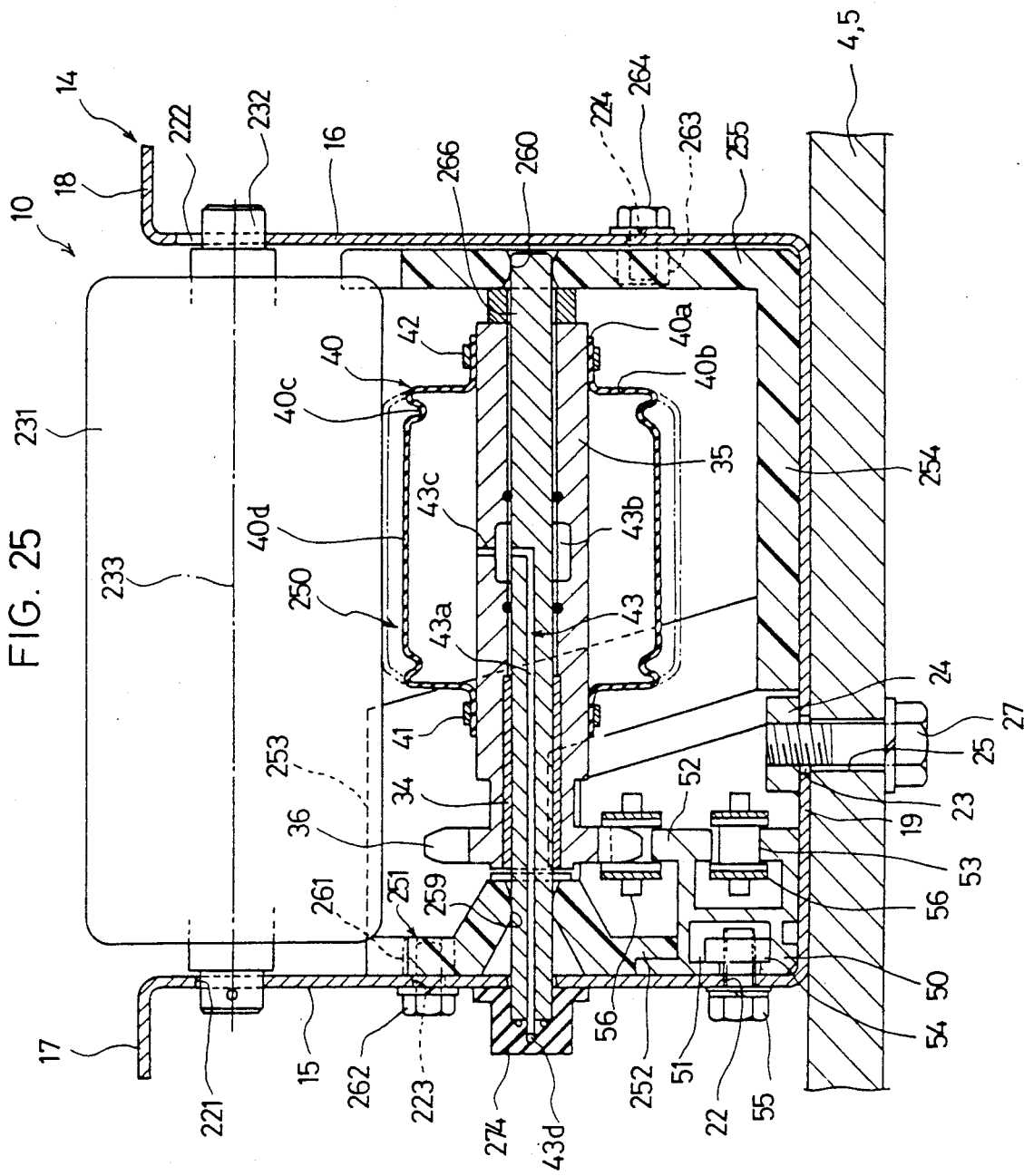
FIG. 25 is a sectional view of a tenth embodiment of a drive system roller apparatus of the invention.
Figure 26:
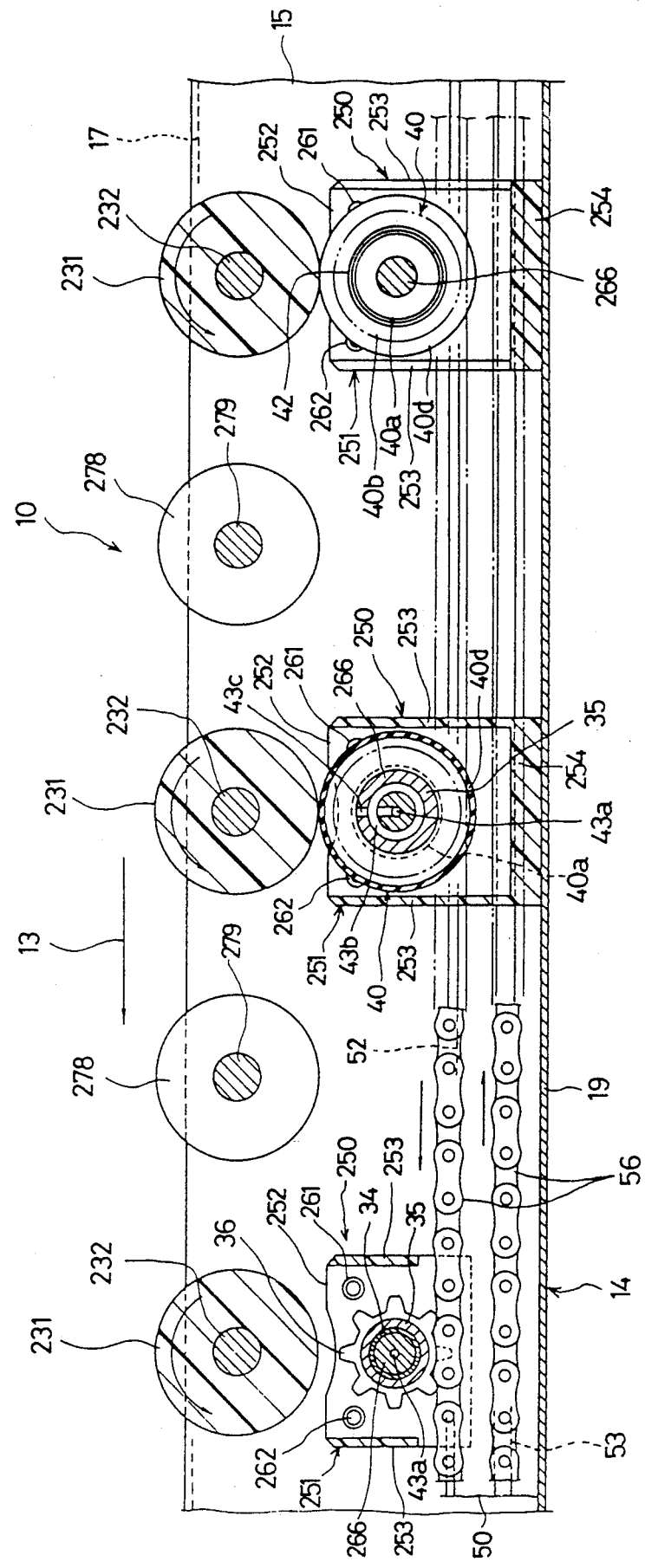
FIG. 26 is a partially cutaway side view thereof.

FIGS. 25 and 26 show a tenth embodiment of the present invention. Shaft bores 221 and 222 are formed at the upper portion of side plates 15 and 16 of conveyor frame 14 and bolt bores 223 and 224 are formed at intermediate portions of the same at the positions spaced at the predetermined pitches lenthwise of the frame 14 respectively. Reference numeral 231 designates a roller of resin and a roller shaft 222 thereof is inserted into the shaft bores 221 and 222 so that the roller 231 is mounted to the conveyor frame 14 in relation of being rotatable around the axis 233 of the roller 231.

In the conveyor frame 14 between the roller guide and the guide rail 50 is provided a transmission device 250 in association with the chain 56 and capable of contacting and removing with and from the roller 231. In the transmission device 250, a support frame 251 formed of resin has a first support plate 252 freely in contact with the inner surface of one side plate 15 and is freely fitted on the upper portion of a guide rail 35, a pair of cover plates 253 extending from the front and rear ends of support plate 252 toward the other side plate 16, a holder 254 for connecting between the lower ends of cover plates 253 and extending to the side plate 16, and a second support plate 255 integral with the holder 254 and freely contacting with the inner surface of the side plate 16.

The holder 254 is desirably mounted on a base plate 19, bearing bores 259 and 260 are formed at the central portions of both the support plates 262 and 255, a nut 261 is embedded in part of support plate 252 above one bearing bore 259, and a bolt 262 inserted into a bolt bore 23 from the exterior is screwed with a nut 261, thereby fixing the support plate 252 to the side plate 16. A nut 263 is embedded in the support plate 255 below the other bearing bore 260 and a bolt 264 inserted from the exterior into a bolt bore 224 is screwed with the nut 263, thereby fixing the support plate 255 to the side plate 16.

A support shaft 266 parallel to the axis 233 of roller 231 is inserted into the bearing bores 259 and 260 to be fixed to the support frame 251, onto which shaft 266 is rotatably fitted a tubular member 35 and at one end thereof is integrally provided a sprocket 36. Onto the tubular member 35 is fitted a rubber tire 40 contactable and removable with and from the lower portion of roller 231 by expansion and contraction, the rubber tire 40 being fixed to the tubular member 35 through bands 41 and 42 as the same as the former embodiment. In addition, reference numeral 43 designates a fluid supply and discharge conduit and 274 designates a cap.

A pair of roller 231 and transmission device is alternately disposed and between the respective rollers is rotatably supported a roller shaft 278.

In such construction, the rubber tire 40 different from the former embodiments in being disposed not within but below the roller 231. However, as the same as the above respective embodiments, the transport of load by rotatable drive of roller 231 and by release of rotatable drive thereof can be stopped by expansion and contraction of rubber tire 40.

Although several embodiments have been described, they are merely exemplary of the invention and not to be constructed as limiting, the invention being defined solely by the appended claims.

What is claimed is:

1. A drive system roller apparatus for a roller conveyor, having:
   a frame disposed in the transporting direction of said roller conveyor;
   a roller shaft supported to said frame;
   a roller body rotatably disposed at the outer periphery of said roller shaft and being supportable of a load to be transported;
   an annular flexible member rotatably disposed between said roller shaft and said roller body and expandable and contractable so as to be capable of abutting against and moving away from the inner surface of said roller body;
   fluid supply means which perforates said roller shaft to be open within said flexible member and supplies operating fluid into said flexible member so as to enable said flexible member in condition of contraction to be expanded, and a roller device having a
   means for rotatably driving said flexible member.

2. A drive system roller apparatus according to claim 1, having a braking device, said braking device having:
   a braking roller shaft supported to said frame;
   a braking roller body disposed at the outer surface of said braking shaft to be rotatable and supportable of a load to be transported;
   an annular braking flexible member not-rotatably disposed between said braking roller shaft and said braking roller body and being expandable and contractible so as to be contactable with and removable from the inner surface of said braking roller body; and
   braking fluid supply means which perforates said roller shaft to be open within said braking flexible member and supplies an operating fluid into said braking flexible member to thereby enable said braking flexible member in contraction condition to be expanded.

3. A drive system roller apparatus according to claim 2, wherein
   said rotatable drive means has a sprocket integrally rotatable with said flexible member and a driving chain traveling along said frame and engageable with said sprocket;
   a brake device has a braking sprocket integrally rotatable with said braking flexible member,
   said braking sprocket has a not-toothed portion for preventing engagement with said driving chain, and
   said brake device has means for preventing rotation of said braking sprocket.

4. A drive system roller apparatus according to claim 1, wherein said roller shaft is not-rotatably supported to said frame, and said roller device has;
   a tubular member rotatably fitted to the outer periphery of part of said roller shaft at the inner periphery side of said roller body and mounting said flexible member;
   an annular braking flexible member fixed to the outer periphery of the other part of said roller shaft at the inner periphery side of said roller body and being contactable with and removable from the inner surface of said roller body by the expansion and contraction; and
   braking fluid supply means which perforates said roller shaft to be open within said braking flexible member and supplies an operating fluid into said braking flexible member so as to enable said braking flexible member in the contraction condition to be expanded.

5. A drive system roller apparatus according to claim 4, having a roller device having not a braking function, said roller device having not said braking function removes said braking flexible member from the outer periphery of the other part of said roller shaft at the inner periphery side of said roller body and removes said braking fluid supply means.

6. A drive system roller apparatus according to claim 1, wherein said roller shaft is rotatably supported to said frame, said flexible member is fixed to said roller shaft, and said roller body is rotatably supported to said roller shaft.

7. A drive system roller apparatus according to claim 1, wherein said roller shaft is not-rotatably supported to said frame, and said roller device is rotatably fitted onto the outer periphery of said roller shaft at the inner periphery side of said roller body and has a tubular member to which said flexible member is mounted and sealing means disposed between said roller shaft and said tubular member so as to constitute part of said fluid supply means.

8. A drive system roller apparatus according to claim 1, wherein said roller body is supported by a pair of bearings to said roller shaft, and said flexible member is disposed between said roller shaft and said roller body is sandwiched between both said bearings.

9. A drive system roller apparatus according to claim 1, further comprising a second roller body having a larger diameter body capable of being fitted on and fixed to said first-mentioned roller body.

10. A drive system roller apparatus according to claim 1, wherein at least one of said roller bodies is provided lengthwise of said frame, and said drive system roller apparatus has a plurality of rotatable rollers extending in parallel to said roller body and provided lengthwise of said frame, annular recesses formed at the outer peripheries of said roller body and rotatable rollers, and endless belts stretched across said annular recesses adjacent to each other.

11. A drive system roller apparatus for a roller conveyor, having;
a frame disposed in the direction of transporting of said roller conveyor,
a roller rotatably supported to said frame and supportable of a load to be transported,
a support shaft supported to said frame below said roller,
an annular flexible member which is rotatably disposed around said support shaft and being expandable and contractable so as to be contactable with and removable from said roller by the expansion and contraction,
fluid supply means which perforates said support shaft so as to be open within said flexible member and supplies an operating fluid into said flexible member to thereby enable said flexible member in condition of contraction to be expanded, and
means for rotatably driving said flexible member.

* * * * *